US008325854B2

(12) United States Patent
Andrews et al.

(10) Patent No.: US 8,325,854 B2
(45) Date of Patent: Dec. 4, 2012

(54) TECHNIQUES FOR COMMUNICATING OVER SINGLE-OR MULTIPLE-ANTENNA CHANNELS HAVING BOTH TEMPORAL AND SPECTRAL FLUCTUATIONS

(75) Inventors: Michael R. Andrews, Berkeley Heights, NJ (US); Partha Pratim Mitra, Summit, NJ (US); Karin Sigloch, New Providence, NJ (US); David J. Thomson, Kingston (CA)

(73) Assignee: Alcatel Lucent, Paris (FR)

( * ) Notice: Subject to any disclaimer, the term of this patent is extended or adjusted under 35 U.S.C. 154(b) by 3093 days.

(21) Appl. No.: 10/194,610

(22) Filed: Jul. 12, 2002

(65) Prior Publication Data

US 2004/0009781 A1    Jan. 15, 2004

(51) Int. Cl.
*H04L 27/06* (2006.01)
(52) U.S. Cl. ..... 375/340; 375/230; 455/501; 455/67.11; 455/296; 370/252
(58) Field of Classification Search ........... 375/259, 375/229–232, 340; 455/50.1, 52.1, 52.3, 455/67.1, 296, 226.1, 501, 67.11; 570/252
See application file for complete search history.

(56) References Cited

U.S. PATENT DOCUMENTS

| 5,191,594 | A | * | 3/1993 | Argo et al. | 375/130 |
| 5,513,215 | A | * | 4/1996 | Marchetto et al. | 375/233 |
| 5,539,412 | A | * | 7/1996 | Mendelson | 342/192 |
| 6,263,029 | B1 | * | 7/2001 | Alard et al. | 375/340 |
| 6,580,358 | B1 | * | 6/2003 | Nysen | 340/10.41 |
| 6,654,384 | B1 | * | 11/2003 | Reza et al. | 370/469 |
| 6,834,043 | B1 | * | 12/2004 | Vook et al. | 370/310 |
| 2002/0186800 | A1 | * | 12/2002 | Berthet et al. | 375/347 |
| 2003/0063854 | A1 | * | 4/2003 | Barwicz et al. | 385/37 |
| 2003/0236072 | A1 | * | 12/2003 | Thomson | |
| 2004/0240570 | A1 | * | 12/2004 | Alard et al. | 375/260 |

OTHER PUBLICATIONS

Robust speech pulse detection using adaptive noise modelling; N.B. Yoma, F. McInnes and M. Jack; Electronics Letters Jul. 18, 1996 vol. 32 No. 75; pp. 1350-1352.*
Thomson, D.J., Spectrum estimation and harmonic analysis, Proceedings of the IEEE, Sep. 1982, Volume: 70, Issue: 9, pp. 1055-1096.*

* cited by examiner

*Primary Examiner* — Dac Ha
(74) *Attorney, Agent, or Firm* — Ryan, Mason & Lewis, LLP

(57) ABSTRACT

This inventions provides techniques for estimating both temporal and spectral channel fluctuations with the duration of a data symbol. Certain pulse shaping functions are Discrete Prolate Spheroidal Sequences (DPSSs) and are used primarily because of their relatively limited Inter-Symbol Interference (ISI) properties. During reception, these properties allow one or more parameters of a joint time-frequency channel model to be more easily determined. Once the one or more parameters are determined, they can be applied to received symbols to correct the temporal fluctuations, spectral fluctuations, or both of the channel over which a communication took place. The techniques may be adapted for the Multiple-In, Multiple-Out communication situation.

16 Claims, 17 Drawing Sheets

TECHNIQUES FOR COMMUNICATING OVER SINGLE- OR MULTIPLE-ANTENNA CHANNELS HAVING BOTH TEMPORAL AND SPECTRAL FLUCTUATIONS

FIELD OF THE INVENTION

The present invention relates generally to communications over wireless channels, and more particularly, to techniques for communicating over single or multiple antenna channels having both temporal and spectral fluctuations.

BACKGROUND OF THE INVENTION

In a single antenna wireless communication, a single transmitter communicates with a single receiver over a wireless channel. In a multiple antenna wireless communication, multiple transmitters communicate with one or more receivers over a wireless channel. Each receiver can determine multiple outputs corresponding to the multiple transmitters. This is commonly called Multiple-In, Multiple-Out (MIMO), and is a relatively recent addition to the wireless field.

Ideally, any transmitted signal appears at the receiver as a received signal, where the transmitted and received signals are identical except for a time delay caused by the time the transmitted signal takes to traverse the channel. However, many wireless channels cause fluctuations in the received signal. For instance, a receiver may be moving away from the transmitter, which will cause a temporal fluctuation. As another example, the transmitted signal may bounce off of multiple buildings on the way to the transmitter. These different and slightly delayed signals can cause destructive or constructive interference. This type of interference can cause spectral fluctuations.

There are techniques for compensating for these fluctuations. For instance, many techniques send "pilots," which are known symbols, during a communication. A receiver uses the pilots to attempt to correct for either temporal or spectral fluctuations, but not both. However, pilot usage can get very high for the MIMO communication systems. Each pilot takes the space of data, so more pilots means less bandwidth for data transmission. Moreover, each of these techniques to correct temporal or spectral fluctuations of wireless channels causes its own set of problems. A need therefore exists for techniques that correct for temporal and spectral fluctuations and also allow for MIMO communication systems.

SUMMARY OF THE INVENTION

Generally, the present invention provides techniques for communicating over single- or multiple-antenna channels, where the channels can vary both temporally and spectrally. Basically, certain pulse shaping functions are used to modulate input symbols during transmission. The pulse shaping functions are Discrete Prolate Spheroidal Sequences (DPSSs) and are used primarily because of their relatively limited Inter-Symbol Interference (ISI) properties. During reception, these properties allow one or more parameters of a joint time-frequency channel model to be more easily determined. Once the one or more parameters are determined, they can be applied to received symbols to correct the temporal fluctuations, spectral fluctuations, or both of the channel over which a communication took place.

In a first aspect of the invention, techniques are disclosed for preparing and, if desired, transmitting data using Discrete Prolate Spheroidal Sequences (DPSSs). Symbols are modulated using the DPSSs and then combined into a transmitter signal. The transmitter signal is then generally transmitted. In one embodiment, certain DPSSs are chosen to transmit data symbols. Additionally, others of the DPSSs are chosen to modulate pilot symbols, which are known symbols. Furthermore, a "guard symbol" may be modulated by a particular DPSS chosen for its order between a group of pilot symbols and a group of data symbols. In an additional embodiment, the DPSSs chosen to modulate the pilot symbols are chosen to have the highest orders of all of the symbols used to modulate the data symbols, the pilot symbols, and, if used, the guard symbol. In another embodiment, for a predetermined time duration and bandwidth, the number of DPSSs is chosen such as to keep spill-over very low (beneficially under five percent) while at the same time having as large a number of information-carrying symbols as is possible under this energy constraint.

In another embodiment, techniques are disclosed for decoding data. One or more parameters of a joint time-frequency channel model are determined, and the one or more parameters are applied to demodulated symbols to determine decoded symbols. In one embodiment, certain demodulated symbols correspond to pilot symbols. These certain demodulated symbols are used to determine the parameters. This usually occurs by using a system of equations, generally represented as matrices. In one embodiment, the parameters determine the time slope, frequency slope, and amplitude of a plane used to estimate the temporal and spectral fluctuations of the channel. Once one or more parameters are known, the parameters can be applied to remaining demodulated symbols. Application of the parameters takes place through a system of equations, generally represented through matrices.

The techniques of the first and second aspects may be extended to be used in a MIMO system of a third aspect of the present invention, where multiple transmitters communicate with multiple receives over multiple communication channels.

A more complete understanding of the present invention, as well as further features and advantages of the present invention, will be obtained by reference to the following detailed description and drawings.

DETAILED DESCRIPTION

Figure 1:
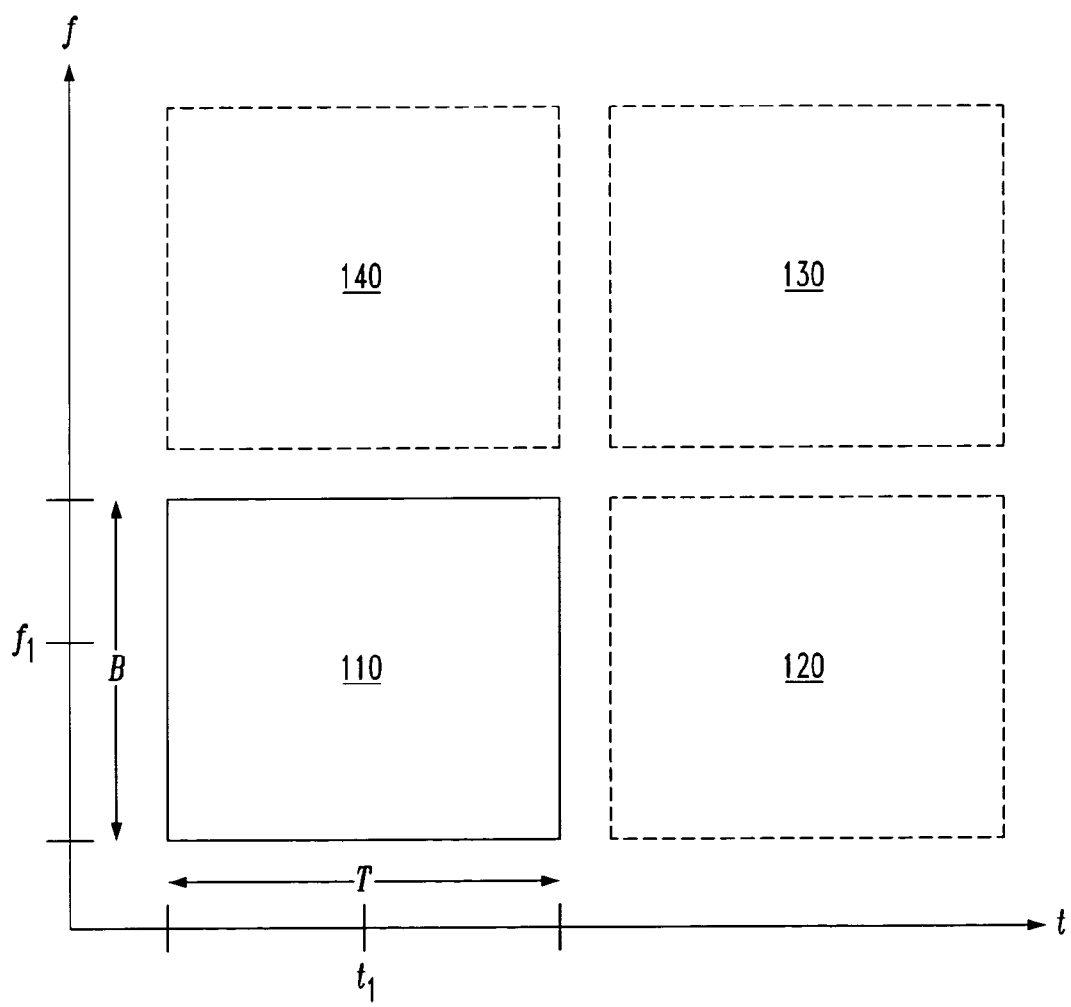
FIG. 1 is a chart illustrating how global time-frequency resources are divided into time-frequency blocks.

Aspects of the present invention provide techniques for estimating the temporal and spectral fluctuations of a wireless channel and using the estimations to compensate for much of the signal degradation damage caused by the fluctuations. Basically, the channel is modeled through a joint time-frequency channel model, which is usually represented as containing a time-varying transfer function that relates transmitted symbols to received symbols.

By using pilot symbols, the location and values of which are known to both the receiver and the transmitter, parameters of the joint time-frequency channel model are determined. The parameters determined are the parameters of the time-varying transfer function. The parameters basically define aspects of a plane used to model the time-varying transfer function of the channel. The parameters define the amplitude (where the center of the plane is located), and the slopes in time and frequency. Once the parameters are determined, the model of the channel is fixed for a particular transmission block and the parameters are applied to demodulated symbols to create decoded symbols. This process has been shown to reduce errors caused by temporal and spectral fluctuations of the channel.

It should be noted that aspects of the present invention will correct for channel fluctuations, even if the channel varies only temporally or only spectrally. Additionally, the representations of the "plane" created with the model of the channel used herein are shown for purposes of explanation only. Because the channel model uses complex-valued parameters, the plane created by these parameters is simply a technique used to visualize aspects of the present invention. This visualization of planes is mathematically not exact in the sense that the temporal evolution of a signal or system is linked to its spectral content by the Fourier transform. It is therefore not possible to specify both temporal and spectral content totally independently of one another as could be suggested by the image of a plane totally flat in the direction of both time and frequency.

In technical terms, conventional techniques deal with time-invariant channels within the data symbol. In this disclosure, a "data symbol" is the temporal span of the smallest unit of data that is sent. It is not that conventional channel models do not allow for time variation. Instead, it is that the variation does not occur during a particular symbol. In conventional techniques, the channel is allowed to fluctuate symbol to symbol, in principle, and can be re-estimated for each symbol, in principle.

By contrast, the present invention allows for a time variant channel model within individual data symbols. Thus, the present invention proposes a channel model that cannot be represented as a purely frequency varying channel within an individual data symbol. It should be noted, however, that the channel model proposed herein may have a zero time slope coefficient, further described below, which means that, for one or more individual data symbols, the time-variance is determined as being zero.

A "time variant" channel is by definition a channel that is not "time invariant." In other words, time variance is defined by negating its opposite. A time invariant channel is one whose properties do not depend on absolute time. Briefly, a linear channel is given by the following input-output relation (which is described in greater detail below):

$$y(t) = \sum_{t'} h(t, t')x(t').$$

For a time invariant channel, the transfer function $h(t,t')$ is a function only of the difference time, $t-t'$. In other words, $h(t,t')=f(t-t')$. A channel that cannot be written in this form is time variant. A well known set of terminology that describes time invariant and time variant is "stationary" and "non-stationary," respectively. See, for instance, Proakis, "Digital Communications," McGraw-Hill, 64-64 (3rd ed. 1995), the disclosure of which is hereby incorporated by reference.

The present invention proposes a more general form of transfer functions, and suggests appropriate parameterizations. One specific proposal described herein is to express the transfer function in the Slepian basis and use parameters of the transfer function to correct time and frequency variations. The techniques presented herein are applicable to many components of a communication system, such as transmitters, receivers, modulation systems, and channel estimators.

For ease of reference, the disclosure is divided into sections: Section 1 gives information on why time-frequency channel estimation is used; Section 2 describes the first-order time frequency model of aspects of the present invention; and Section 3 describes exemplary apparatus used to carry out the invention and implementation issues.

1 Why Time-Frequency Channel Estimation?

This section describes conventional techniques for channel estimation, describes the problems associated with these techniques, and introduces techniques of the present invention.

1.1 Introduction

Real-world communication channels are not stationary. Instead, they vary both in time and in frequency. Temporal fluctuations are caused by moving objects in the environment. When waves originate from a transmitter that moves in relation to the receiver, or when waves bounce off moving objects in the environment, they are shifted in frequency. These are the well-known "Doppler effects." It should be noted that the spectrum of a transmitted waveform is unchanged, other than a frequency shift, by the Doppler effect. The magnitudes of these effects depend on the speed at which transmitters, receivers and objects are moving in relation to each other, as well as the wavelength, $\lambda$, of the waves. These speeds change over time, thereby causing the temporal fluctuations in the channels. In addition, received power changes over time because wave attenuation changes: as objects move in the environment, reflected waves have to travel over varying distances from the transmitter to the receiver.

Spectral fluctuations are caused by multiple echoes interfering at the point of reception. The way they interfere is determined by the positions and scattering properties of the environmental features that caused the echoes (such as walls, furniture or people) relative to the wavelength. Since the wavelength, $\lambda$, is directly linked to the frequency, f, by wave velocity, $c=\lambda f$, different frequencies are treated selectively by the channel, some interfering constructively, others destructively.

Channel fluctuations act on the transmitted waveforms by altering their amplitudes, phases and spectral content. For the receiver, these alterations obscure the information that was originally sent and thus present an obstacle in the process of correctly decoding the digital symbols. It is therefore crucial to reverse or compensate for the effect of the channel as much as possible by finding out what exactly the nature of the distortion is. This process of "learning" the channel is referred to as channel estimation. Both temporal and spectral variations have their share in the distortion, so in general both of them should be taken into account for an optimal estimation result and, ultimately, error free decoding.

1.2 Modeling Temporal and Spectral Fluctuations

For the most general model for channels with both time and frequency variation, the time domain is first examined. The time-variant impulse response, $h(t,\tau)$, of a channel is given by the relation between the transmitted waveform x(t) and the received waveform y(t) (It should be noted that baseband notation is used here. The variables x, y, h, and their Fourier transforms are therefore in general complex valued):

$$y(t) = \int_{\tau=-\infty}^{0} h(t,\tau)x(t-\tau)d\tau. \qquad (1.1)$$

This model considers the channel as consisting of a continuum of multi-path components. For more information, see Proakis at page 764, the disclosure of which has already been incorporated by reference. The variable $\tau$ is the delay of each signal component $x(t-\tau)$, and since $\tau$ is continuous, an infinite number of echoes is taken into account (referred to as "continuous scattering"). The attenuation, $h(t,\tau)$, of the echoes varies over time $t$ due to Doppler effects, and it also varies with $\tau$, due to the interference of echoes at the receiver. The received waveform is obtained by summing over all echoes with non-positive delays, since physical channels are causal systems.

The time-variant transfer function, H(t,f), is obtained by taking the Fourier transform of the time-variant impulse response $h(t,\tau)$ as follows:

$$H(t,f) = \int_{\tau=-\infty}^{+\infty} h(t,\tau)e^{-2\pi i f \tau}d\tau. \qquad (1.2)$$

If known, $h(t,\tau)$, or equivalently H(t,f), would completely characterize the channel. The main interest is in estimating either of these functions. The above expressions, which relate the input of the system to its output, cannot be simplified in the general case. As the global behavior of the real channel appears stochastic, the estimation problem is approached by locally fitting the model function $h(t,\tau)$ to measured input and output data. For this purpose, the global signaling resources, time and bandwidth, are treated piecewise in conventional techniques.

FIG. 1 shows a known concept of dividing the time-frequency plane into rectangles of duration, T, and bandwidth, B. These rectangles will be referred to as time-frequency blocks 110, 120, 130, and 140. Block 110, for example is centered at $(t_1, f_1)$ and occupies an area equivalent to TB. Each block is associated with a burst, which is a packet of digital symbols modulated onto the physical waveforms that cover the block. Most of the symbols will be the random data to be transmitted. Yet, in every block, some of the symbols have to be devoted to carrying known values. These known values are the so-called "pilot" symbols, by which the unknown parameters of the channel model $h(t,\tau)$ are estimated.

The better the quality of these estimates, the fewer decoding errors there are. If the model is not adequate, or if there are not enough pilot signals to obtain a good estimate, errors will occur. In that case, retransmission must occur and thus nothing has been gained by saving on pilots. On the other hand, an arbitrarily accurate estimate of the channel cannot be an objective either, as this would require a large number of pilots. That strategy would not leave many resources for transmitting data, the thing of primarily interest. Evidently, there is a fundamental trade-off between safely sending little data, or sending a lot of data at a high risk of corruption. Given an upper limit of distortion (or decoding errors) that may be tolerated, the overall objective is to minimize the required number of pilot symbols per time-bandwidth area. This will be referred to as "pilot efficiency" or "estimation efficiency."

For communication channels, better modeling must mean taking into account both time and frequency variation, as both are actually present. Current technology focuses on circumventing the problem by choosing very small time-frequency blocks. What is lost through this technique is pilot efficiency. Poor modeling of the physical layer causes a good part of the limitations of today's wireless systems. In cellular communications, typically 10 percent of all symbols are pilots. Still, the number of symbol errors on the physical layer often is also on the order of 10 percent or higher, even with this high pilot overhead.

While it is high in single-antenna wireless, the pilot overhead can become overwhelming for MIMO systems. In these systems, multiple transmitters transmit over a channel to multiple receivers, which then output decoded symbols from the multiple transmitters. This is described in more detail in reference to FIG. 12. The problem with MIMO is that there are $N^2$ more coefficients to estimate than in the scalar case, where N is the number of transmit and also, generally, receive antennas. Since the propagation path from every transmit antenna to every receive antenna is assumed to be independent from all other paths, there are N×N independent scalar time-varying transfer functions $h(t,\tau)$ to estimate. In general, all of them are time and frequency varying with the same characteristics as in the scalar case. The cost of "learning the channel" thus grows with $N^2$, while even in the best case the total number of symbols (or channel capacity) only grows linearly with N. It is currently not clear how future MIMO systems would be able to carry any significant amount of data at all, if the current simple estimation strategies were just to be carried over to the matrix case. The pure numbers show why, in practice, pilot efficiency becomes a critical consideration. High performance in terms of pilot efficiency is a key feature of the new kind of modeling principle proposed in the present invention.

1.3 Three Simple Special Cases

As has been shown, the general channel model is the following:

$$y(t) = \int_{\tau=-\infty}^{0} h(t,\tau)x(t-\tau)d\tau.$$

There are certain general preconditions that mark the limits as to which channels can be handled successfully by piecewise approximation using blocks in the time-frequency plane. One could think of mathematical functions for the behavior of the real channel that would make communicating almost impossible, because the channel would be extremely incoherent. Basically, it is assumed that most of the energy that is transmitted within a certain time-bandwidth block does stay in this block when passing through the channel. Channels are excluded that transfer energy from the signaling band to any arbitrary other frequencies far out of the signaling band. Additionally, channels are excluded that distribute significant amounts of energy over a very long time scale. (Note that a long average delay or transit time between sending and receiving waveforms does not affect the functioning of the scheme; instead, this is accounted for by synchronization.) Considering the physical causes of channel variation, it is plausible that those "bad" channels are not likely to occur. Time variation is caused by Doppler effects, which typically spread energy only to neighboring frequencies, as moving objects usually do not move at arbitrarily high speeds. Frequency variation is caused by echoes and these are not expected to persist infinitely.

Within the mentioned limitations, one is free to choose a model $h(t,\tau)$. Yet so far tools have been lacking to treat joint time-frequency estimation within blocks. It is therefore common practice in wireless communication systems to exploit three simpler special cases, that only involve either time or frequency variation. These are explained below.

1.3.1 Time Translational Invariant Channel

The transfer function of a time translational invariant channel is modeled as follows:

$$h(t,\tau)=h_0(\tau)$$

where $h_0$ is a fixed function regardless of time. In that case, input and output are directly related in the frequency domain (strictly speaking, this relation only holds for infinite window sizes):

$$Y(f)=H^c(f)X(f)$$

where Y, $H^c$ and X denote the Fourier transforms of y, $h_0$ and x, respectively. The time translational invariant model is appropriate if the actual temporal channel variation is very small compared to the duration of the signaling waveform, $x(t)$. The Code-Division Multiple Access (CDMA) modulation scheme assumes this to be the case (by engineering, i.e., choosing waveforms that are short enough). The impulse response can then be determined by sending broadband pilot sequences, waiting for all echoes to arrive back and autocorrelating the received waveform to determine the delays of the taps in the impulse response.

Figure 2A:
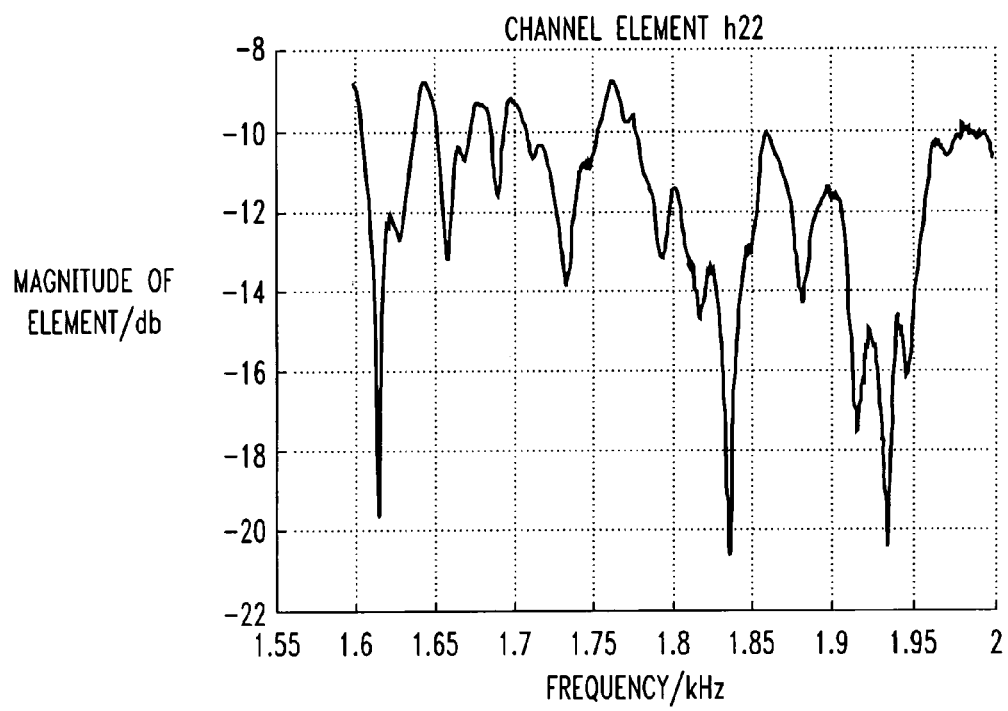
FIGS. 2A and 2B are charts of magnitude and phase, respectively, of an acoustic channel transfer function, used to illustrate a time translational invariant channel.
Figure 2B:
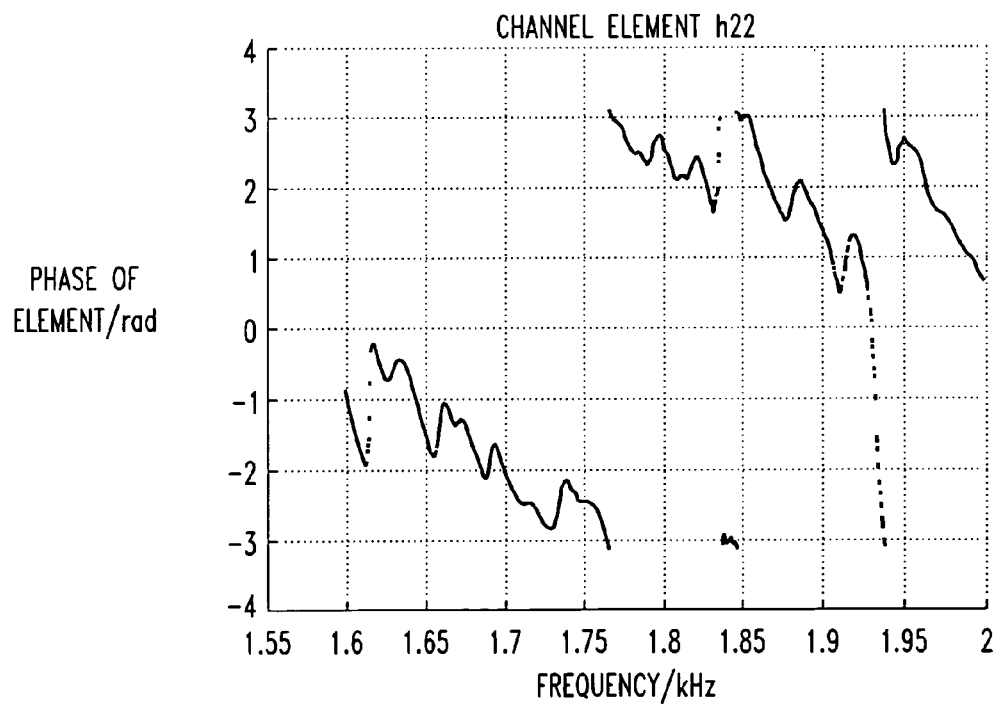

FIGS. 2A and 2B show the magnitude and phase, respectively, of a transfer function H(f) of an indoor acoustic channel between 1600 Hz and 2000 Hz. This transfer function was measured in a cafeteria at a time when there was practically no movement. It shows the typical characteristics also found for transfer functions of wireless channels: a large dynamic range with deep fades where the function drops by ten decibels or more, and relatively regular spacing of these fades.

A problem with this technique is it assumes that the actual temporal channel variation is very small compared to the duration of the signaling waveform. If this is not the case, then decoding errors can occur.

1.3.2 Stochastic Channel with "Flat Fading"

The transfer function of a stochastic channel with flat fading is modeled as follows:

$$h(t,\tau)=h_1(t)\delta(\tau)$$

where $\delta$, the Dirac impulse, means that all frequencies of the input signal pass through the system without any delay. As a consequence, there is no interference of echoes; the frequency spectrum is flat. The waveform is modulated over time by a stochastic amplitude, $h_1(t)$. The output can simply be written as $y(t)=h_1(t)x(t)$. In practice, one can engineer a system so that it works with this channel model, by confining the signaling waveform to a narrow band. In physical systems, spectral variation is continuous. The channel is thus always reasonably flat if one chooses the bandwidth interval small enough.

Figure 3A:
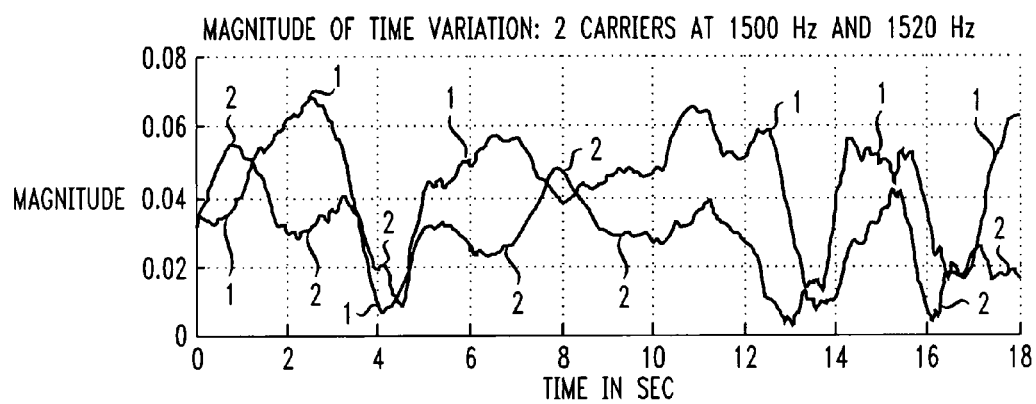
FIGS. 3A and 3B are charts of magnitude and phase, respectively, of two tones, used to illustrate a stochastic channel with "flat fading"
Figure 3B:
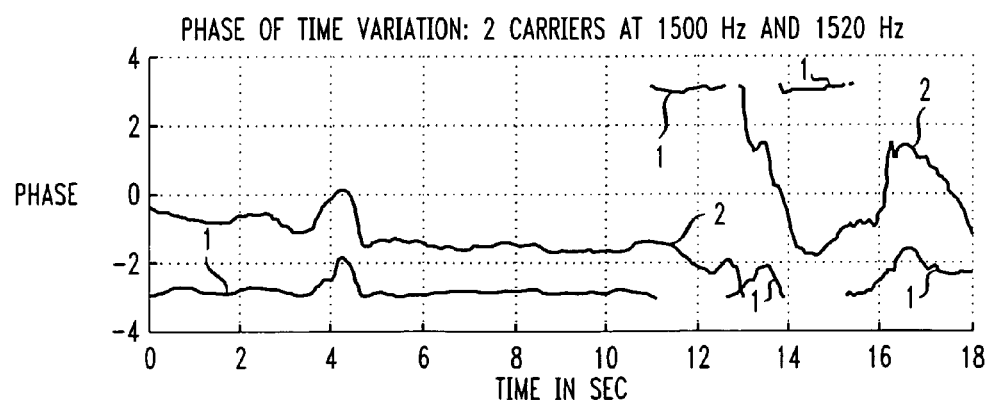

FIGS. 3A and 3B show magnitude and phase measurements, respectively, of time variation of the acoustic channel of a cafeteria around lunch time, when people were moving in the room and passing by the experiment. The transmitted waveforms were two pure tones with time invariant amplitudes at 1500 Hz and 1520 Hz. Plotted are the received waveforms (which are of course directly proportional to $h_1(t)$ since there is no frequency dependence) over an interval of 18 seconds, after demodulation to the baseband and denoising. Clearly, the amplitude fluctuations in time are considerable, and this is only an indoor environment. Outdoors, the fluctuations could be much more rapid, for example when cell phones are used in cars.

A problem with this technique is that the frequency spectrum is considered to be flat. If there are variations in frequency caused by the channel, this approximation does not hold.

1.3.3 Time Invariant and Flat Fading

The transfer function for a time invariant and flat fading channel is as follows:

$$h(t,\tau)=h_2\delta(\tau)$$

This simplest of all schemes assumes all frequencies pass equally well at all times. The input waveform is only distorted by multiplication with a complex constant transmission factor $h_2$, as it passes through the channel. This channel model is still widely used in communications, particularly in the Time Division Multiple Access (TDMA) and Orthogonal Frequency Division Multiplexing (OFDM) standards. Obviously both burst duration and bandwidth of the pulse shaping functions have to be chosen "small," in order for the time invariant and flat fading assumptions to hold. If this is not true, then decoding errors can occur.

1.4 Channel Coherence and Modeling

Figure 4A:
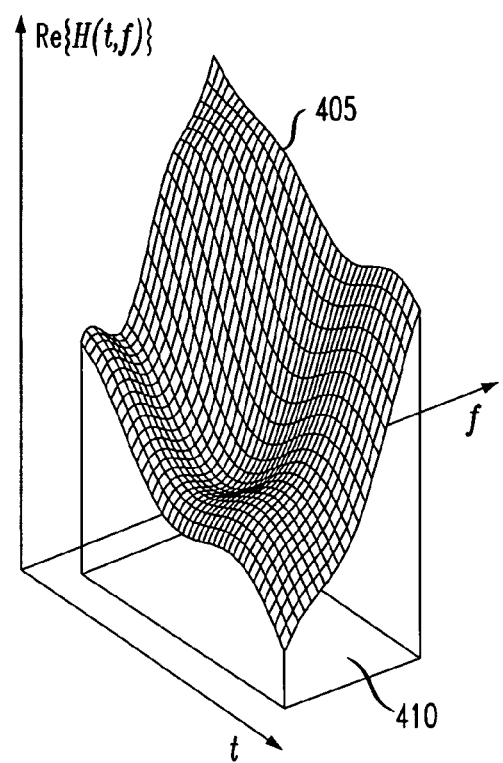
FIG. 4A is a chart illustrating a possible actual time- and frequency-variant transfer function of a physical channel.
Figure 4B:
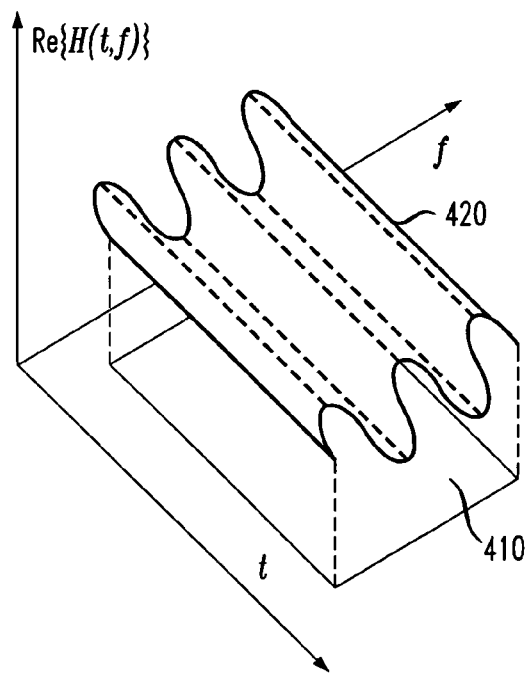
FIG. 4B is a chart illustrating a prior art technique for modeling a frequency-varying transfer function.

In order to work well, each of the three models has different requirements in terms of channel coherence of the physical channel. Channel coherence is determined by coherence time and coherence bandwidth. For details about the definitions of coherence time and coherence bandwidth see, for example, Proakis, which has been incorporated by reference above. Basically, coherence time is large when Doppler spread is small. Long coherence time means that the channel does not vary rapidly over time. Coherence bandwidth is large when the echoes die down quickly at the receiver. Large coherence bandwidth means that there is not much variation over frequency. Consider FIG. 4A, a visualization of possible channel variation. Again, it should be noted that the visualizations shown herein are not mathematically exact but are useful for description purposes. The warped hyperplane 405 shown in FIG. 4A represents the real part (the imaginary part could look similar) of a time and frequency varying channel, H(t,f), over one signaling block, represented by the rectangle 410 in the time-frequency plane.

The time translational invariant channel approximates this hyperplane 405 with another hyperplane that is curved in the dimension (direction) of frequency, but flat in the dimension of time. See FIG. 4A, where curve 420 is an example of what this other hyperplane might look like. As shown in FIG. 4A, curve 420 varies in frequency, but is the same in time. In other words, at each "slice" of time, the curve looks exactly the same. Obviously, the real channel H(t,f) is not flat in the dimension of time. Its coherence time is finite, but since the channel works under the assumption of infinite coherence time, time variation is not captured. The results are errors in channels estimation and thus Inter-Symbol Interference between the data symbols. The same thing happens for the stochastic channel with "flat fading," if one replaces "time" with "frequency" in the above argument, and vice versa.

Figure 4C:
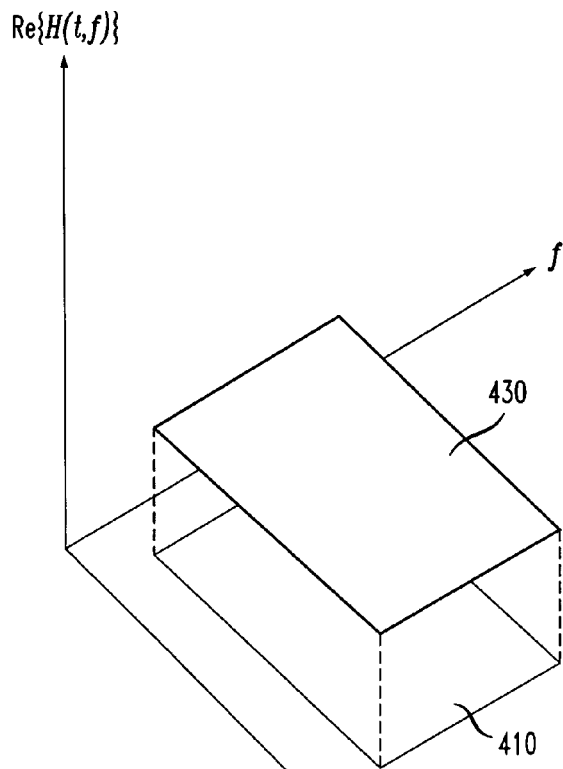
FIG. 4C is a chart illustrating a prior art technique for modeling a time-varying transfer function.

Even cruder is the estimation of the time invariant and flat fading channel: this zeroth-order scheme simply approximates the hyperplane 405 by a flat horizontal plane, with correspondingly large errors. This is illustrated in FIG. 4C, where horizontal plane 430 is used to estimate the hyperplane 405.

Given a certain model, a way to keep errors down is to choose smaller signaling blocks. The problem is that, for every block, the model coefficients must be estimated again. As one devotes resources (time and bandwidth) to pilot symbols, one wants to use them as efficiently as possible. A good model is a model that captures reality in an efficient way over wide ranges of the independent parameters t and f, meaning that it compresses a large part of the information contained in the channel variation in relatively few parameters. The minimum number of needed pilot symbols is proportional to the number of channel coefficients to estimate. Good models therefore need few pilots. Since it is known that there are both temporal and spectral variation present, it is reasonable to expect that time-frequency models would be more pilot-efficient.

Figure 4D:
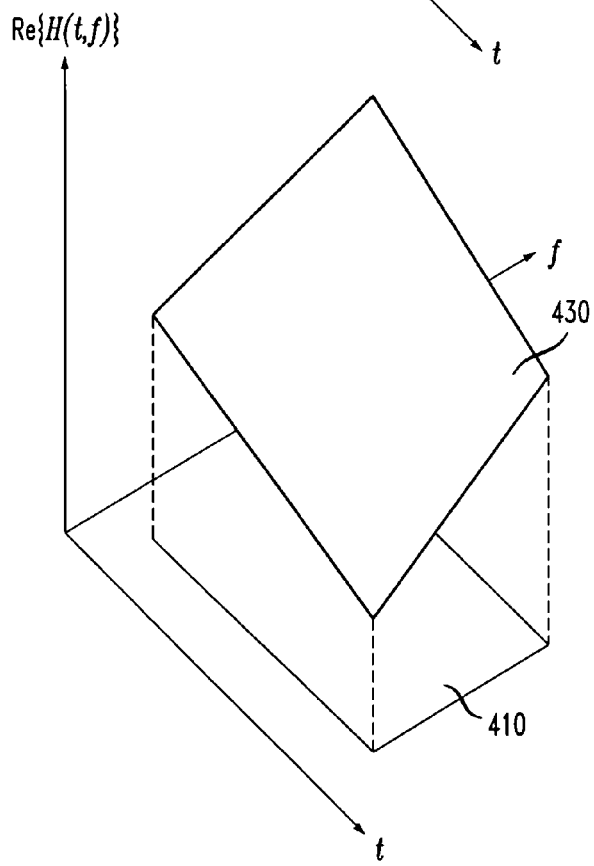
FIG. 4D is a chart illustrating a technique of the present invention, which models a transfer function that varies in both time and frequency, in accordance with a preferred embodiment of the invention.

An example of a time-varying transfer function for a time-frequency model used in the present invention is shown in FIG. 4D. The time-varying transfer function of the present invention creates a plane 440 that can change in time and frequency and amplitude. Consequently, plane 440 models hyperplane 405 to a better degree than do other models.

2 The First-Order Time-Frequency Model

This section introduces the first-order time frequency model, and describes the DPSS basis and the DPSS functions. It should be noted that DPSS functions are commonly called "Slepian" functions. This name is chosen because of David Slepian, who was the first to find out that these functions were optimal solutions to the problem of simultaneous time and frequency band limitation of a signal.

2.1 Introducing Joint Time-Frequency Estimation

A scheme is presented herein that is capable of taking into account both time and frequency variation. A first-order time-frequency channel model is considered, making the following assumptions:

(1) The input time series, x(t), undergoes multiplication with linear time and a complex-valued, constant factor H$^t$ (the "time slope coefficient," since it is the first time derivative) as it passes through the channel. The time variation in the channel thus produces an output component of the following:

$$y^{(t)}(t) = tH^t x(t).$$

(2) The Fourier transform, X(f), of the input undergoes multiplication with linear frequency and a complex-valued factor H$^f$, the "frequency slope coefficient." The frequency variation in the channel thus produces an output component y$^{(f)}$(t), the Fourier transform of which is given by the following:

$$Y^{(f)}(f) = fH^f X(f)$$

(3) Part of the input waveform passes through the channel without distortion, and is only attenuated by a complex amplitude H$^c$. The corresponding output component is y$^{(c)}$(t)=H$^c$x(t).

The complete received waveform is then y(t)=y$^{(c)}$(t)+y$^{(t)}$(t)+y$^{(f)}$(t). Unfortunately, this cannot be expressed directly in terms of x(t), as y$^{(f)}$(t) is expressed in the frequency (Fourier) basis, while y$^{(t)}$(t) is expressed in the time basis. An important step in the approach taken herein is to use yet another basis, one that deals naturally with both linear time and frequency variation. Returning to the intuitive interpretation of FIG. 4D, the model of the present invention approximates the hyperplane of FIG. 4A by a plane segment 440 that is tilted in both directions, time and frequency.

2.2 The First-Order Channel Model

The channel model is a matrix model, the discrete time version of Equation 1.1:

$$y_j = \sum_{i=1}^{n} H_{ji} X_i \quad (2.1)$$

Note that here i and j are discrete times, since time series are sampled in digital communications. The variable i takes the place of t−τ in Equation 1.1. The variable n is the number of samples of the time series, and it is equal to the duration T of the time series, times the sampling rate 1/ΔT.

The choice of T must be guided by physical considerations. One physical consideration involves looking at measurements of channel statistics like FIGS. 3A and 3B to determine a time interval over which the channel can be assumed to have only linear (first-order) variation. In a similar way, the signaling bandwidth, B, the "width" of the time-frequency block, is chosen. Measurements of channel transfer functions like FIGS. 2A and 2B indicate the coherence of the channel. The bandwidth, B, is chosen such that frequency variation typically is only of no higher than first-order over intervals of that bandwidth.

For the following derivation of the channel model, indicial notation (Einstein notation) is used that has the advantage of staying readable when there are a lot of indices involved. A short introduction to the Einstein notation is given in Appendix B of Karin Sigloch, "Communicating Over Multiple-Antenna Wireless Channels With Both Temporal and Spectral Fluctuations" (2002) (published Master's thesis, University of Karlsruhe, Germany), the disclosure of which is hereby incorporated by reference. In the following, the channel model for the single-antenna case is derived. The terms involved are therefore of no higher than second order; expressions like "$A_{ij}B_{jl}c_l$" can thus simply be read as matrix and vector multiplications where i, j, and l are the indices into the matrices A and B and the vector c. This compact notation is very useful when the channel model for the general MIMO case, of N antennas on both transmitter and receiver side, is derived. The channel transfer function, H, is then a fourth-order tensor. The following indices are used:

| basis variable | indices | range |
|---|---|---|
| time | i, j | 1, ..., n |
| frequency | u, v | 1, ..., n |
| Slepians | k, l | 1, ..., K |

The general channel Equation 2.1 in indicial notation is as follows:

$$y_j = H_{jl} x_l \qquad (2.2)$$

The first-order time and frequency variations are modeled by the following:

$$y_j = (H^c \delta_{jl} + H^t T_{jl} + H^f F_{ljl}) x_l, \text{ and} \qquad (2.3)$$

$$y_j = \delta_{ji} x_i H^c + T_{ji} x_i H^f \qquad (2.4)$$

In matrix format, Equation 2.4 is shown as follows:

$$y_j = \quad \delta_{ji} \quad x_i \; H^c \qquad T_{ji} \quad x_i \; H^t \qquad F_{ji} \quad x_i \; H^f$$

$$\begin{pmatrix} \vdots \\ \vdots \\ \vdots \end{pmatrix} = \begin{pmatrix} 1 & & \\ & \ddots & \\ & & 1 \end{pmatrix} \begin{pmatrix} \vdots \\ \vdots \\ \vdots \end{pmatrix} () + \begin{pmatrix} -\frac{T}{2} & & \\ & \ddots & \\ & & \frac{T}{2} \end{pmatrix} \begin{pmatrix} \vdots \\ \vdots \\ \vdots \end{pmatrix} () + \begin{pmatrix} \; \\ \; \\ \; \end{pmatrix} \begin{pmatrix} \vdots \\ \vdots \\ \vdots \end{pmatrix} (),$$

where $\delta_{ij}$ is the n×n identity matrix modeling the constant part of the channel together with the complex gain $H^c$. $T_{jl}$ is the n×n time operator and $F_{ij}$ is the n×n frequency operator, both in the time basis. In this "normal" basis for time series, the time operator is simply diagonal, with discrete time −T/2, ..., T/2 as its n diagonal entries.

To obtain the frequency operator in the time basis, the frequency basis is first used, where the frequency operator is just diagonal with discrete frequency as its n diagonal entries. This is transformed into the time basis by right and left multiplying it with the n-by-n discrete Fourier transform matrix and its complex conjugate:

$$F_{ij} = \quad D_{iu} \qquad F_{uv}^{(f)} \qquad D_{vj}$$

$$\begin{pmatrix} \; \\ \; \\ \; \end{pmatrix} = \begin{pmatrix} DFT^\dagger \end{pmatrix} \begin{pmatrix} -\frac{B}{2} & & 0 \\ & \ddots & \\ 0 & & \frac{B}{2} \end{pmatrix} \begin{pmatrix} DFT \end{pmatrix}.$$

Figure 5A:
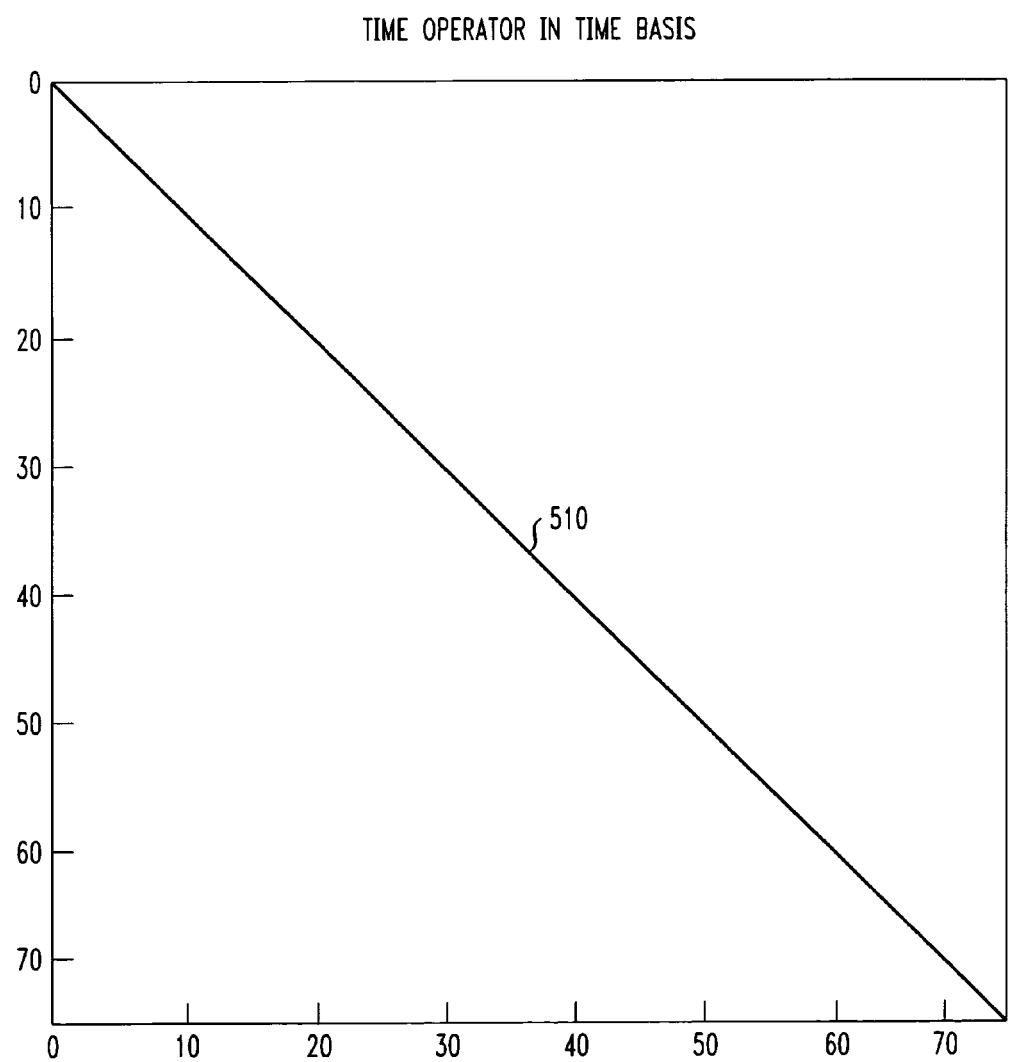
FIGS. 5A and 5B are charts illustrating the time and frequency, respectively, operators, shown in the time basis.
Figure 5B:
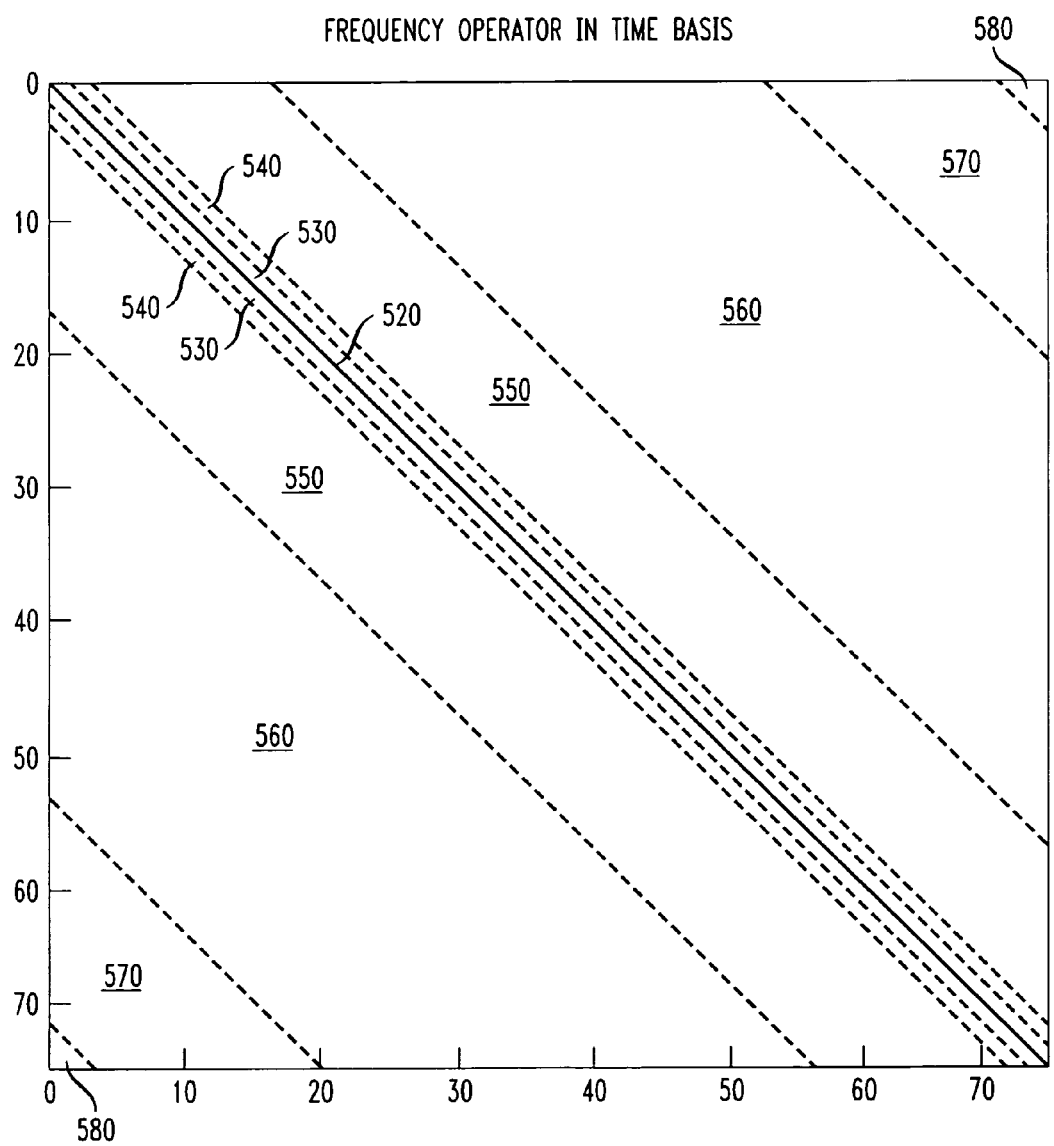
Figure 6A:
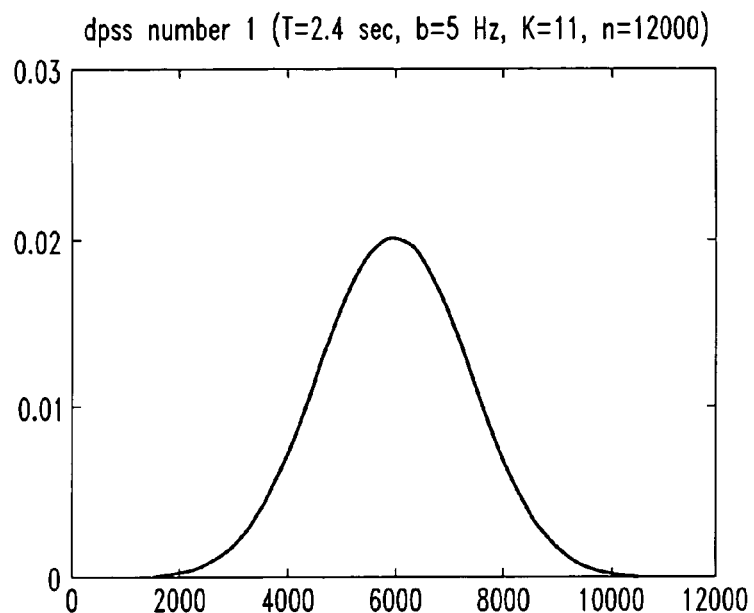
FIGS. 6A through 6F are charts illustrating the first six DPSSs, used in aspects of the present invention.
Figure 6B:
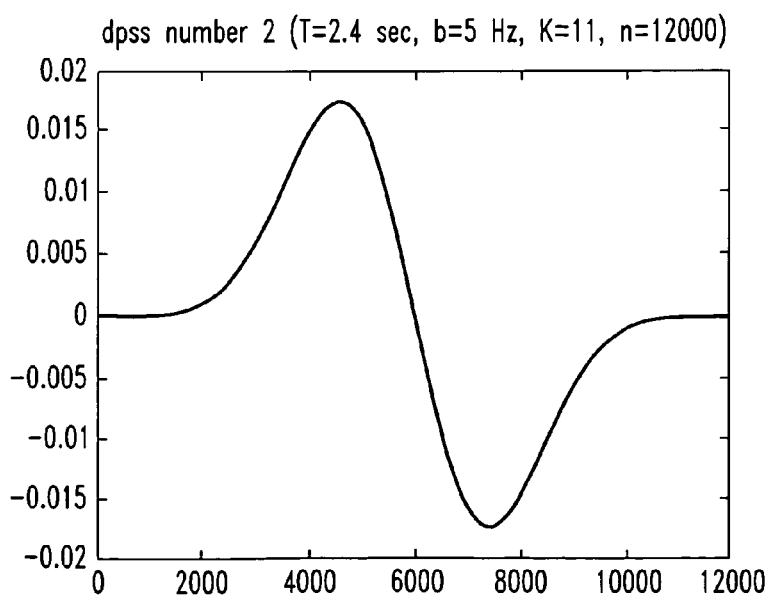
Figure 6C:
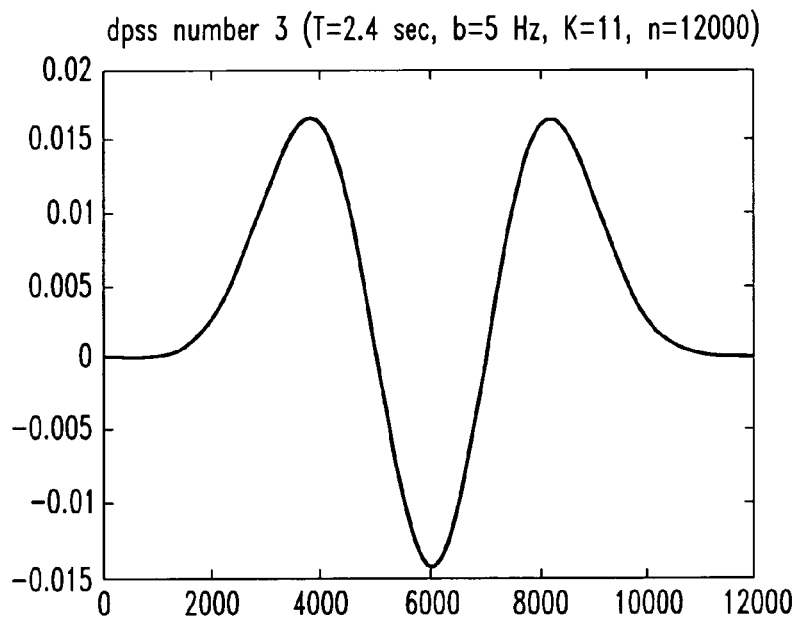
Figure 6D:
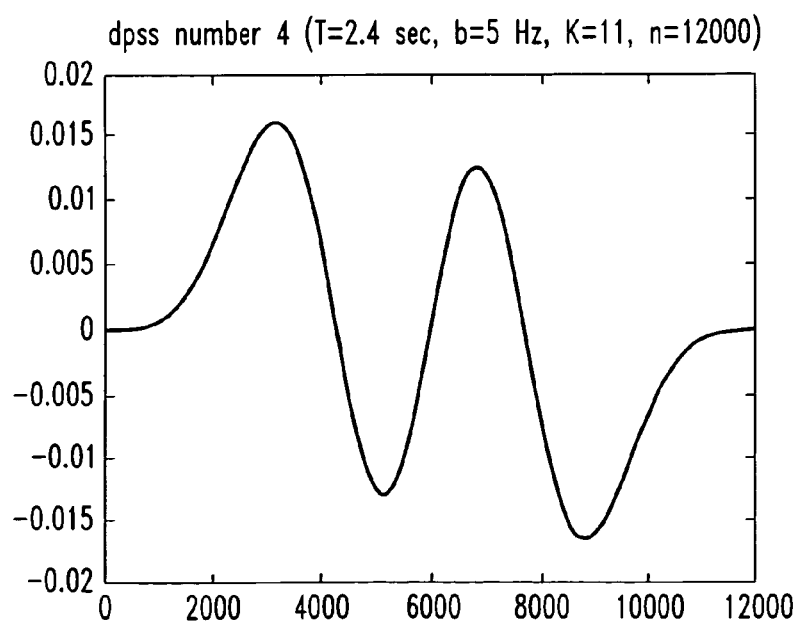
Figure 6E:
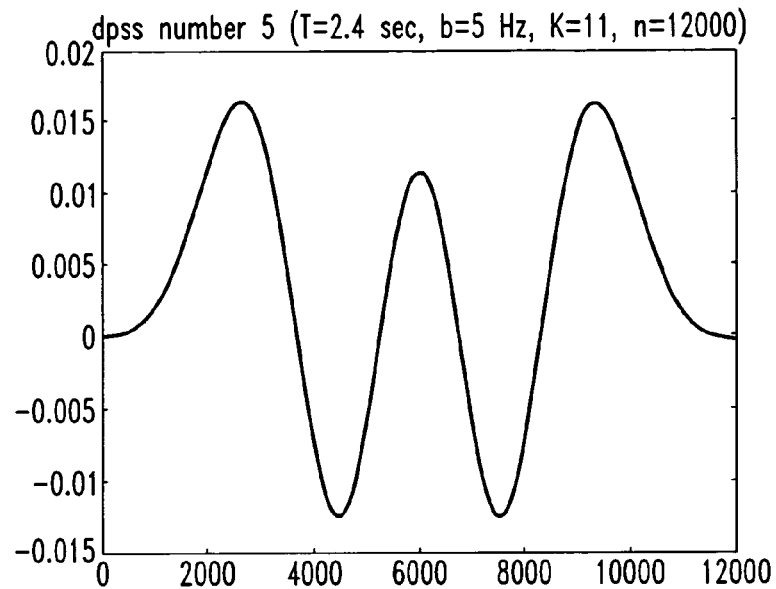
Figure 6F:
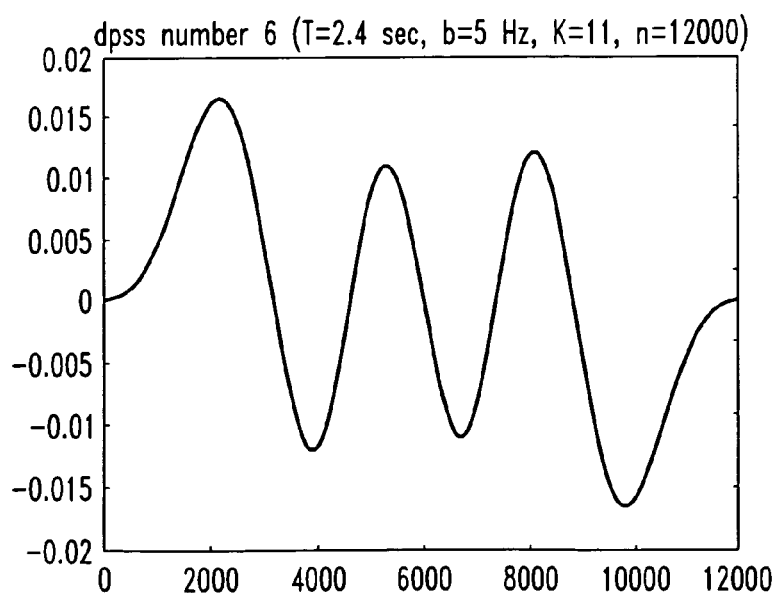

FIGS. 5A and 5B show plots of the time and frequency operators, respectively, in the time basis. The parameters chosen for these plots are T=0.3 s, B=40 Hz, K=11, and n=75. What is plotted is representations of the magnitudes of the complex matrix entries. In FIG. 5A, it can be seen that the time operator in the time basis is a diagonal matrix with non-zero entries on the diagonal 510; all other entries are zero. FIG. 5B shows the frequency operator, which is complex. The values for the areas are as follows: diagonal 520 contains zero values; area 530 contains relatively high values; in area 540, there are values that are not as high as the values in area 530, but are higher than zero; in area 550, there are reasonably small values; the values in area 560 are close to or equal to zero; in area 570, the values again increase; and area 580 contains high values.

Thus, while the time operator looks very simple, the frequency operator has significant non-zero entries far off the diagonal. This confirms that in the time basis, the relation between sent waveform x(t) and received waveform y(t) is complicated, involving all those non-zero coefficients. Thus, an important step in the present invention is to transform the problem to another, more adequate basis. In this new basis, time and frequency operators both look relatively simple, meaning that they have clear structure and only few non-zero entries. This has the effect of limiting ISI.

2.3 The Slepian Basis

A suitable basis is the Slepian basis. Its basis functions are the DPSSs, called Slepian functions. Theoretical work on these functions as the way to separate variables in the prolate spheroidal coordinate system goes back to about 1900. From the 1950's on, they were studied in depth by David Slepian in the context of the concentration problem in spectral analysis. See Slepian, "Prolate Spheroidal Wave Functions, Fourier Analysis and Uncertainty—I," Bell Systems Technical Journal 40, 43-63 (1961) and Slepian Prolate Spheroidal Wave Functions, "Fourier Analysis and Uncertainty—V: The Discrete Case," Bell Systems Technical Journal 57, 1371-1430 (1978), the disclosure of which is hereby incorporated by reference.

Figure 7:
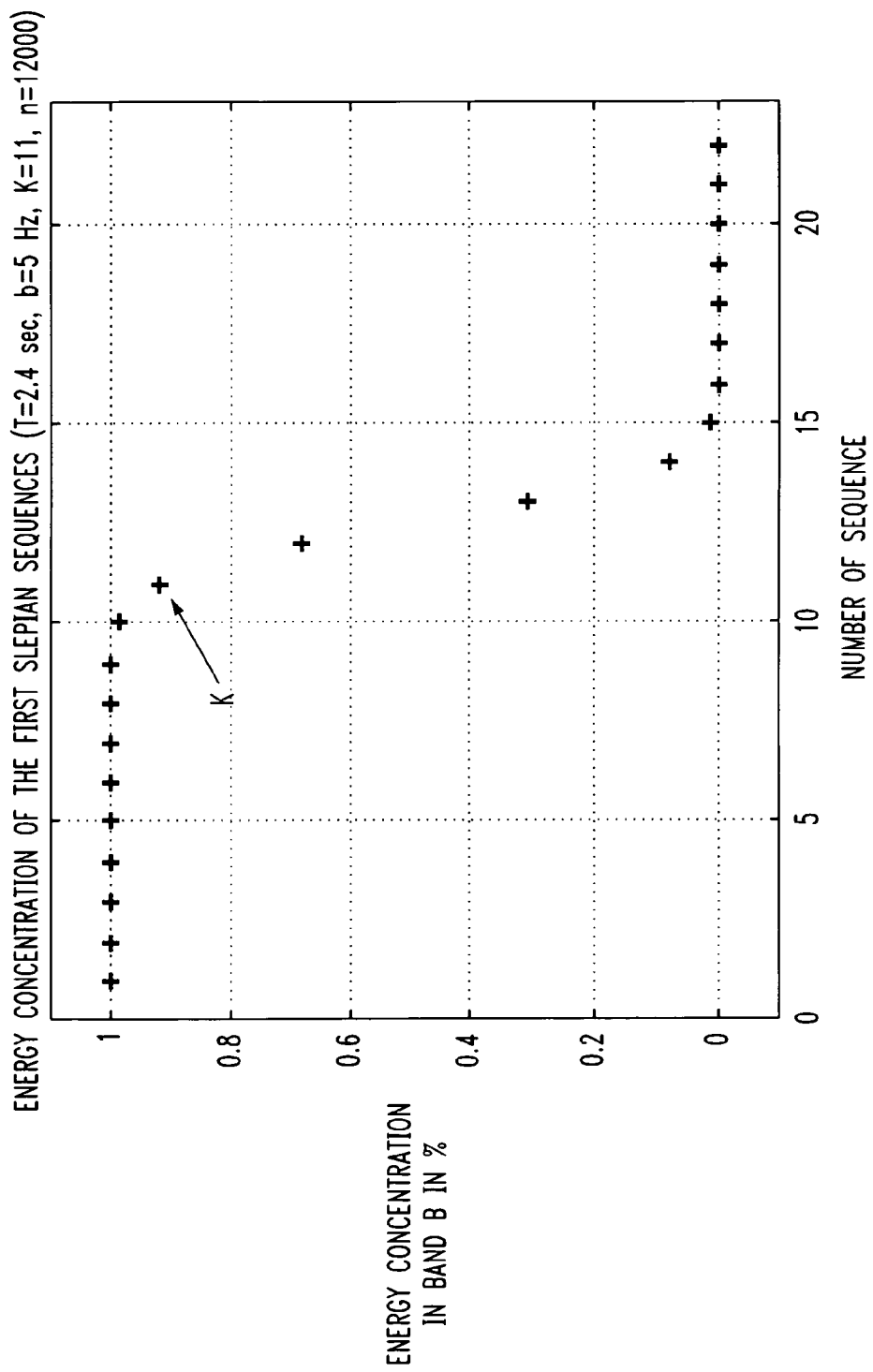
FIG. 7 is a chart illustrating the energy concentration of the DPSSs within a bandwidth B, used to determine an appropriate amount of DPSSs for transmitting data in accordance with a preferred embodiment of the invention.

The DPSSs are a set of orthonormal functions of length n points, where n=T/ΔT. More precisely, they are the set of orthonormal sequences that is maximally concentrated in energy within a chosen bandwidth B. FIGS. 6A through 6F show plots of the first six Slepian functions for T=2.4 s, B=5 Hz, K=11, and n=12000. One can compute n orthonormal Slepian functions, but, after the first K functions, there is a sharp drop in the relative amount of energy concentrated in the band B. FIG. 7 shows the concentration of energy in B over the number of the sequence for the case T=2.4 s, B=5 Hz, K=11, and n=12000. For the communication scheme presented herein, it is beneficial to use only the first K Slepians in order to avoid spilling of energy into neighboring bursts. For instance, as shown in FIG. 7, using K Slepians provides a predetermined energy concentration in band B of approximately 95 percent. If the (K+1)-th Slepian is added for transmission of symbols, then the spillage into other bands is around 30 percent. Consequently, the number K is chosen to provide maximum Slepians (and therefore maximum symbols that can be modulated) with a minimum of out-of-band energy spillage.

It is interesting to note that K=TB−1 is (almost) equal to the time-bandwidth product TB of the block. The variable K is called the number of degrees of freedom of the time-frequency block. Loosely speaking, K is the number of orthonormal functions that can be accommodated by a time-frequency block of duration T and bandwidth B. To understand the physical implications, recall the so-called uncertainty relation of time and frequency, named after Heisenberg's uncertainty relation of position and momentum in quantum mechanics. It states that every physical function has a time-bandwidth product of one or greater. An equivalent way of saying this is that every function must occupy at least an area of one in the time-frequency plane. The time-frequency block in which the Slepians occupy has area TB. It would therefore accommodate at most TB non-overlapping functions, which, if used as probing functions, would provide TB independent pieces of information about the channel. The same can be accomplished with the K (or K+1=TB if one allows for some spilling) first Slepian functions. The difference is that these functions are not distinguished by time slots or bandwidth intervals. Rather, they are independent because of their orthogonality, although each of them covers the whole T*B-rectangle. The number of degrees of freedom, K, where K=T*B−1, is therefore a measure of the independent pieces of information that can be obtained about a time-frequency resource of area K. It does not matter in which way the functions are chosen not to interfere, one can theoretically never get more than (roughly) TB of them.

2.4 Mathematical Properties of the DPSSs

The DPSSs have some interesting properties. To start with, they are their own Fourier transforms, except for a constant factor. Let $\tilde{\psi}_k(f)$ be the Fourier transform of the k th Slepian $\psi_k(t)$. Then the relation is $$\psi_k(t) = c\tilde{\psi}_k(t) \tag{2.5}$$

where c is a complex constant factor.

It is striking that the Slepian sequences look much like the eigenfunctions of the harmonic oscillator in quantum mechanics. In fact, both are solutions to similar concentration problems. Slepians are strictly limited in one dimension, namely time, whereas the harmonic eigenfunctions are not. The eigenfunctions of the harmonic oscillator are equivalent to the Hermite polynomials, except for normalization. The Hermite polynomials (and thus the eigenfunctions, except for constant factors) are created by a simple recurrence relation:

$$H_{k+1}(x) = 2xH_k(x) - 2kH_{k-1}(x)$$

or $$xH_k(x) = kH_{k-1}(x) + 1/2 H_{k+1}(x) \tag{2.6}$$

where x denotes position and $H_k$ the k th Hermite polynomial.

It would be very interesting to know if the same kind of recurrence relation as Equation 2.6 holds for the Slepians, for the following reason: the Slepians $\psi_k$ would take the place of the $H_k$, and time t the place of x. The question then is the following:

$$t\psi_k(t) = c_1\psi_{k-1}(t) \text{ Does this hold?} \tag{2.7}$$

The right hand side multiplies the k th Slepian with a linear time slope, exactly what is desirable to model. The left hand side features only the two neighboring Slepians of $\psi_k$—this means that the time operator would be simply bi-diagonal in the Slepian basis. Even better, the frequency operator would be bi-diagonal also: as Slepians are their own Fourier transforms, Equation 2.7 would hold in the frequency domain if Equation 2.5 is plugged in and the independent variable t is renamed into f. Based on this argument, the following would hold, too:

$$f\tilde{\psi}_k(t) = c_3\tilde{\psi}_{k+1}(t) + c_4\tilde{\psi}_{k+1}(t) \tag{2.8}$$

It turns out that the Equations 2.7 and 2.8 do not hold exactly, since the Slepians are time-limited versions of the eigenfunctions. It almost holds for small k, but spilling into higher functions, and thus out of the band, gets worse as k approaches K. Yet the following relation, which contains a projection back into the band, holds for the first K Slepians:

$$\int_{-\infty}^{+\infty} \psi_k(t) t \psi_l(t) dt \cong 0 \text{ unless } |k - l| = 1. \tag{2.9}$$

The error of "$\cong$" instead of "=" is small, the elements off the two bi-diagonals are orders of magnitude smaller than the elements on the bi-diagonals. Thus the K×K time and frequency operators in the basis formed by the first K Slepians are practically bi-diagonal, while they would not be if all N DPSSs were used. This is another reason for selecting the first K Slepians.

2.5 Channel Model in the Slepian Basis

It has been shown that it is beneficial to choose the first K Slepians as basis functions (as they account for almost all of the energy in the band B), and project the channel model from the n×n time basis down to the K×K Slepian basis, where K is usually much smaller than n. The following notation is used, shown in indicial notation:

(1) $\Psi_{ik}$ denotes the n×K matrix of the K Slepians.

(2) The Slepians are orthonormal:

$$\Psi_{li}\Psi_{ik} = \delta_{lk}.$$

(3) Modulation: let the transmitted waveform $x_i$ be a linear combination of the Slepians:

$$x_i = \Psi_{ik}\tilde{x}_k.$$

The $\tilde{x}_k$ are the digital symbols (pilots and data and guard symbol, if used) to be transmitted. Each of them is modulated on a different Slepian. The scheme thus works with K pulse shaping functions.

(4) Demodulation: the received waveform $y_j$ is demodulated with K matched filters:

$$\tilde{y}_l = \Psi_{lj}y_j,$$

where $\tilde{y}_l$ are the demodulated symbols.

The whole transmission equation in the Slepian basis is thus $$\tilde{y}_l = \Psi_{lj}y_j$$

$$\tilde{y}_l = \Psi_{lj}(H^c\delta_{ji} + H^tT_{ji} + H^fF_{ji})\Psi_{ik}\tilde{x}_k$$

$$\tilde{y}_l = (\Psi_{lj}\delta_{ji}\Psi_{ik}H^c + \Psi_{lj}T_{ji}\Psi_{ik}H^t + \Psi_{lj}F_{ji}\Psi_{ik}H^f)\tilde{x}_k$$

$$\tilde{y}_l = (\delta_{lk}H^c + T_{lk}H^t + F_{lk}H^f)\tilde{x}_k \tag{2.10}$$

$$\tilde{y}_l = H_{lk}\tilde{x}_k \tag{2.11}$$

In the Slepian basis, the matrix, vector, and scalar terms of Equation (2.10) have the following structure:

$$\tilde{y}_l = \delta_{lk} \tilde{x}_k H^c \quad T_{lk} \tilde{x}_k H^t \quad F_{lk} \tilde{x}_i H^f$$

$$\begin{pmatrix} \vdots \\ \vdots \\ \vdots \end{pmatrix} = \begin{pmatrix} 1 & & \\ & \ddots & \\ & & 1 \end{pmatrix} \begin{pmatrix} \vdots \\ \vdots \\ \vdots \end{pmatrix} ( ) + \begin{pmatrix} 0 & \ddots & 0 \\ \ddots & 0 & \ddots \\ 0 & \ddots & 0 \end{pmatrix} \begin{pmatrix} \vdots \\ \vdots \\ \vdots \end{pmatrix} ( ) + \begin{pmatrix} 0 & \ddots & 0 \\ \ddots & 0 & \ddots \\ 0 & \ddots & 0 \end{pmatrix} \begin{pmatrix} \vdots \\ \vdots \\ \vdots \end{pmatrix} ( ).$$

Equation 2.11 is a channel model that permits non-stationarity within one or more individual data symbols. Furthermore, Equation 2.11 expresses a direct relation between the transmitted and received symbols, not the whole waveforms as in the time basis. But as far as the communication problem goes, symbols are the only thing that anyone is really interested in. So the problem is almost solved, as $\tilde{y}_l$ are the received, distorted symbols, and $\tilde{x}_k$ are the sent symbols, partly with known pilots, but mostly with unknown data that is important to retrieve. The model coefficients $H^c$, $H^t$ and $H^f$ are unknown and have to be estimated using the known pilot symbols.

Figure 8A:
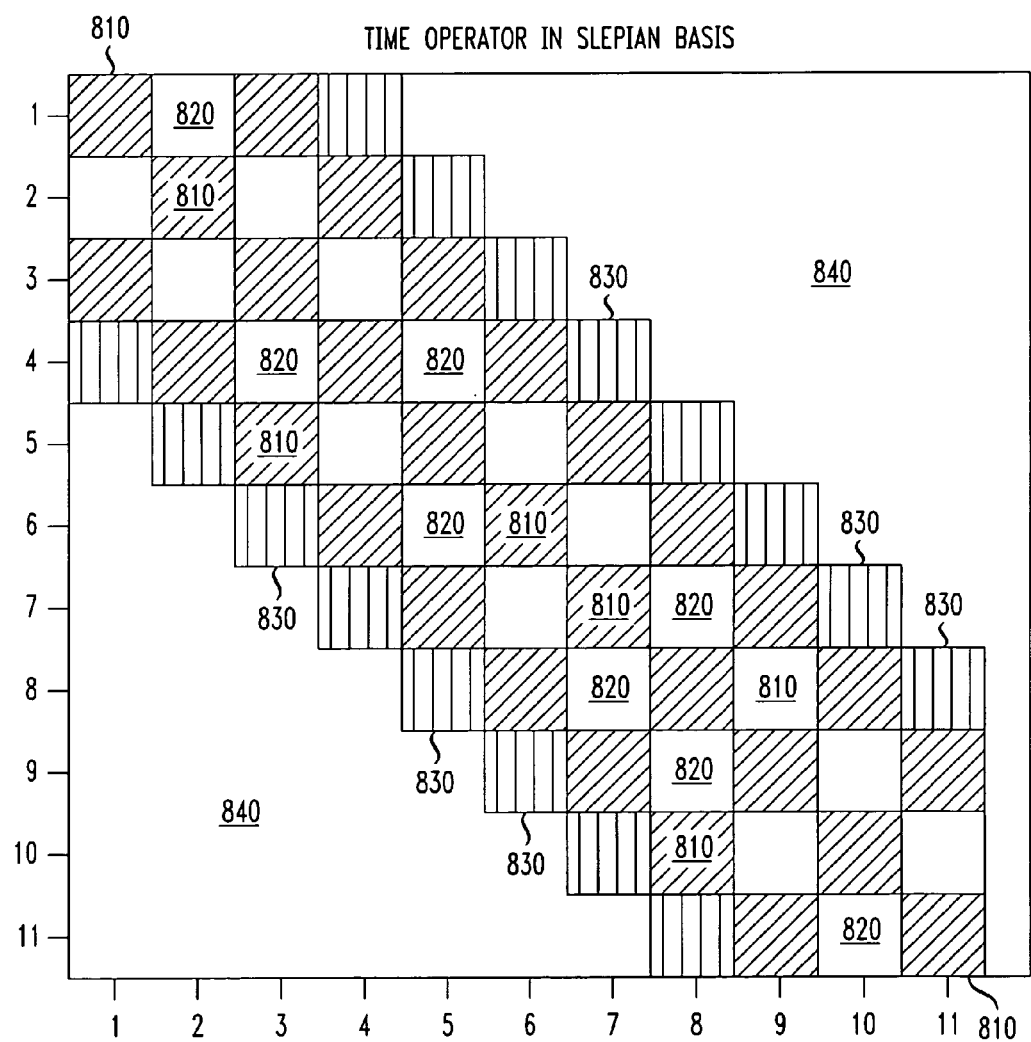
FIGS. 8A and 8B are charts illustrating the time and frequency, respectively, operators, shown in the DPSS basis, and used to decode demodulated symbols in accordance with a preferred embodiment of the invention.
Figure 8B:
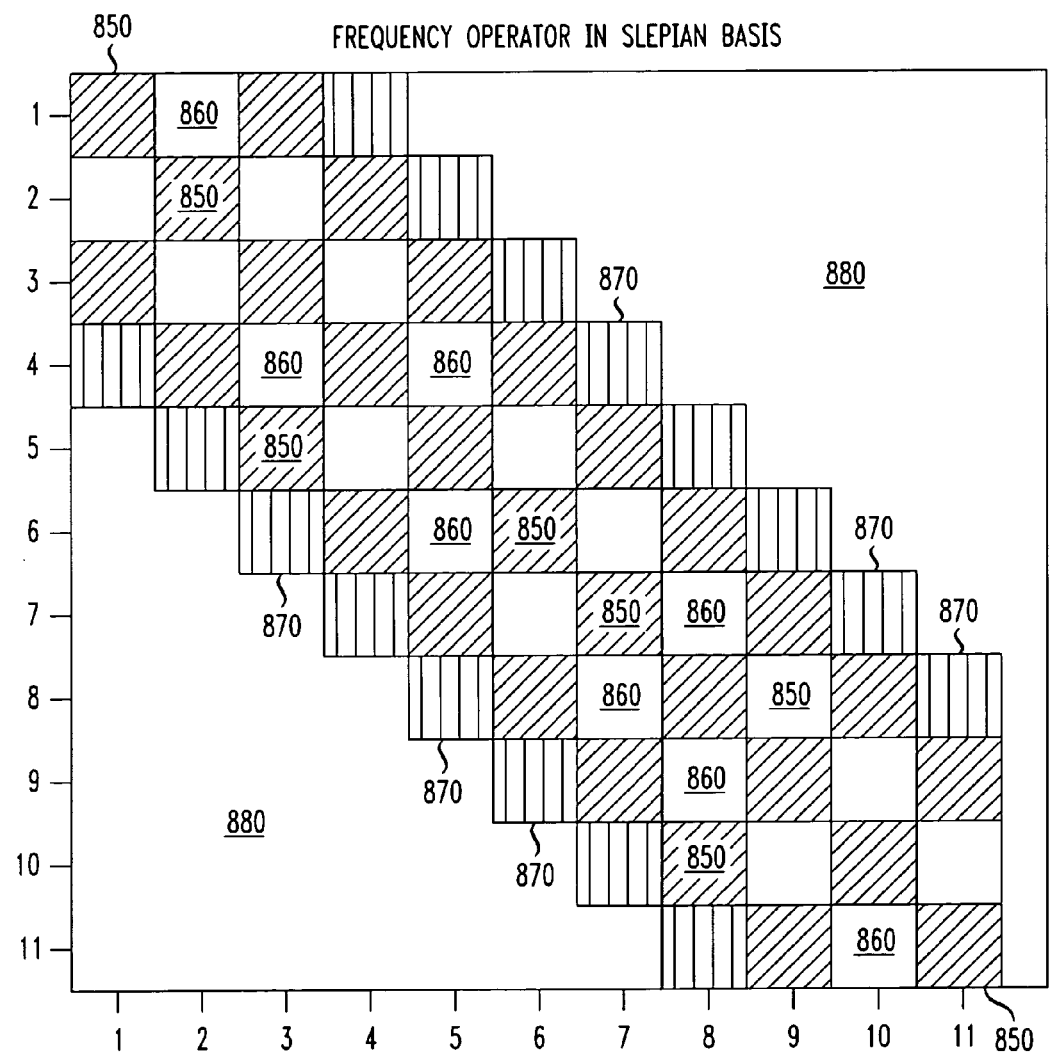

The variables $T_{lk}$ and $F_{lk}$ are the K×K time and frequency, respectively, operators in the Slepian basis, both (almost) bi-diagonal. FIGS. 8A and 8B show plots of the two operators in the Slepian basis for T=2.4 s, B=5 Hz, K=11, and n=12000. In FIG. 8A, the time operator is shown. The following values are associated with the time operator: elements 810 are zero; elements 820 are non-zero and relatively high in value; elements 830 are non-zero and relatively low in value; and elements 840 are approximately zero. FIG. 8B shows the frequency operator for the Slepian basis. The following values are associated with the frequency operator: elements 850 are zero; elements 860 are non-zero and relatively high in value; elements 870 are non-zero and relatively low in value; and elements 880 are approximately zero. Indeed, the elements off the two bi-diagonals are orders of magnitudes smaller than those on the bi-diagonals. The "constant" operator $\delta_{lk}$ is still the unity matrix, of size K×K in the Slepian basis.

The overall channel operator $H_{lk}$ is the sum of the three bracketed terms in Equation 2.10, the sum of constant channel, time variation and frequency variation. As $T_{lk}$ and $F_{lk}$ can be considered to be bi-diagonal and $\delta_{lk}$ is diagonal, $H_{lk}$ has significant non-zero elements only on its diagonal and the two bi-diagonals. This has enormous implications on the decoding. When using Slepians as pulse shaping functions, the value of the k th received symbol $\tilde{y}_k$ depends only on three sent symbols, namely $\tilde{x}_{k-1}$, $\tilde{x}_k$, and $\tilde{x}_{k+1}$. Every symbol is distorted only by its two next neighbors, and in turn loses energy only to its two next neighbors. (This of course is only true if the first-order time-frequency model is a good approximation of physical reality in the given TB block. But this can be shown to be true for a variety of situations.) This simple energy spilling pattern allows for quick decoding with a dynamic programming algorithm that will be described in section 3.1.5.

2.6 Dealing with Synchronization Flaws

It is worth mentioning here that time-frequency estimation, even the relatively simple first-order scheme given here, compensates for two synchronization flaws that commonly arise in digital communications: jitter in the timing of the synchronization instant, and drifts of the carrier frequency. These are additional benefits to using aspects of the present invention.

2.6.1 Errors in Timing

Assume that, due to imperfect clocks or uncertainty about the channel, the moment at which a symbol starts in the received waveform is not determined correctly. To be specific, assume that the receiver determines a symbol to start at time $t_0+\Delta t$ where really it starts at $t_0$. The time delay or jitter $\Delta t$ is interpreted by the demodulation procedure as a phase shift of $2\pi f_0 \Delta t$ in the frequency domain, which is added to the estimation $H^f$ of the spectral fluctuation actually present in the channel. The timing error thus hardly effects the accuracy of decoding at all.

2.6.2 Drifts of the Carrier Frequency

Ideally, the carrier frequency should remain totally stable at $f_0$, but in practice some deviation is often encountered, which is relatively slow, and small compared to $f_0$, but causes great distortion to the symbol after its demodulation to the baseband. Assume that the carrier frequency actually is $f_0+\Delta f$ during symbol demodulation. The frequency "delay" $\Delta f$ is perceived by the estimation scheme as an additional phase shift in time. It is accounted for by the estimation of the time slope $H^t$, in complete analogy to the case discussed in the previous section.

3 Exemplary Apparatus and Implementation Issues

In this section, exemplary apparatus and actual implementation of the first-order time-frequency communication scheme are described.

3.1 Elements of an Exemplary Communication Scheme

Figure 9:
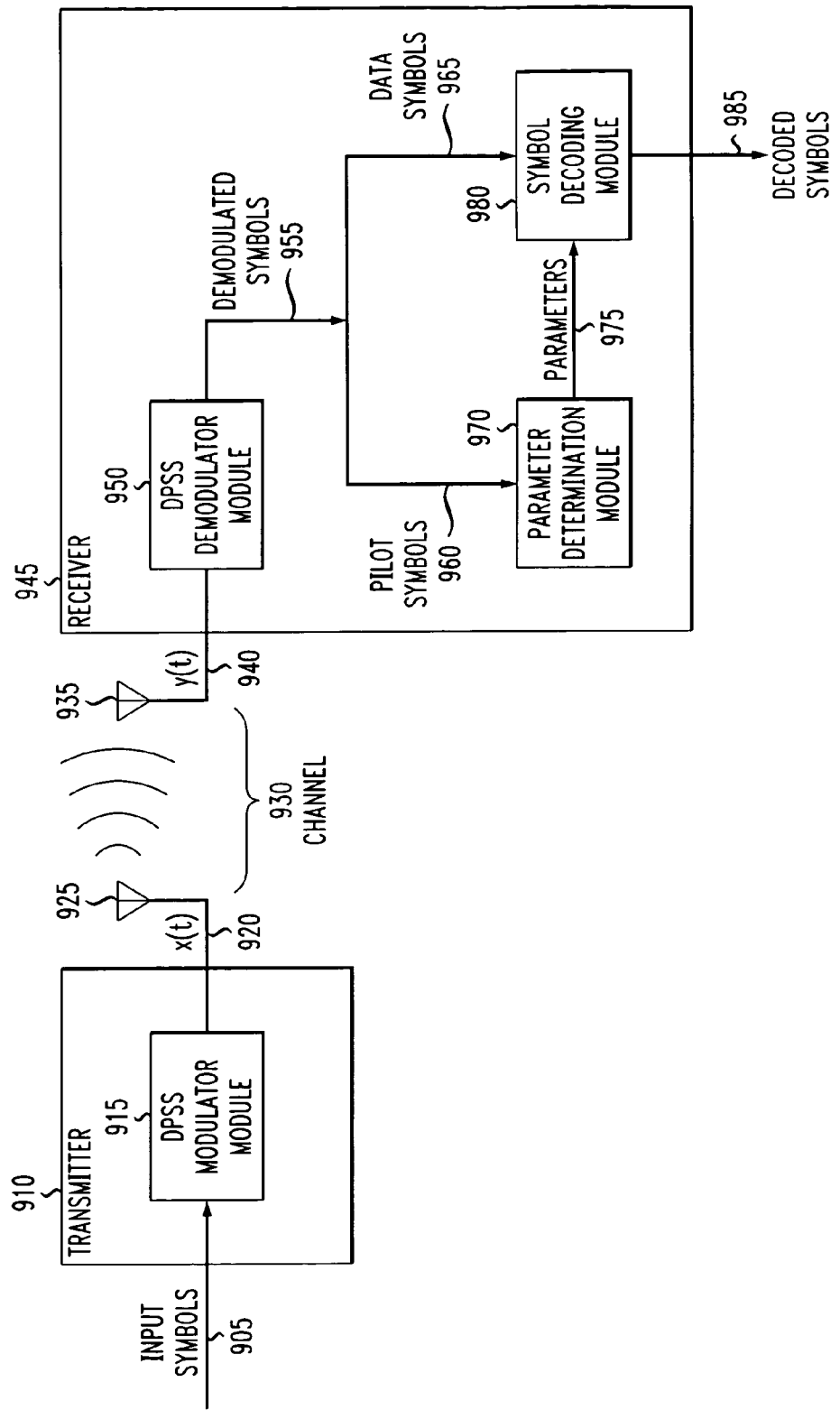
FIG. 9 is a block diagram showing a receiver and transmitter communicating over a wireless channel in accordance with a preferred embodiment of the invention.

An exemplary communication between a receiver and a transmitter using the techniques of the present invention is shown in FIG. 9. Transmitter 910 accepts input symbols 905 and outputs a transmit signal 920. Generally, input symbols 905 are coupled to the transmitter 910 in blocks, as described above in reference to FIG. 1. The transmit signal 920 is coupled to antenna 925 and broadcast over channel 930. The transmit signal 920 is received, after passing through channel 930 and experiencing distortion caused by temporal and spectral effects of the channel 930, by antenna 935 and becomes received signal 940. The received signal 940 is coupled to the receiver 945, which performs certain operations to create decoded symbols 985. Ideally, decoded symbols 985 are equivalent to input symbols 905.

Transmitter 910 comprises an DPSS modulator module 915, shown in greater detail below. Broadly, DPSS modulator module 915 modulates each input symbol 905 with one DPSS function to create a modulated symbol, and then combines the modulated symbols to create transmit signal 920.

Receiver 945 comprises DPSS demodulator module 950, parameter determination module 970 and symbol decoding module 980. The DPSS demodulator module 950 demodulates the received signal 940 by using the same DPSS functions used by the DPSS modulator module 915. The DPSS demodulator module 950 creates demodulated symbols 955, of which some are pilot symbols 960 and some are data symbols 965. The parameter determination module 970 uses the pilot symbols to determine the parameters 975 associated with Equation 2.10 (or Equation 2.11). Basically, the parameter determination module 970 is adapted to determine parameters of a channel model that permits non-stationarity within individual data symbols. One exemplary technique for determining the parameters is discussed below. The parameters 975 are then used by symbol decoding module 980 to create decoded symbols 985. This is described in more detail below.

It should be noted that FIG. 9 represents a somewhat simplistic view of how a true communication system would appear. For instance, transmitter 910 will generally include additional digital modulation devices (such as Binary Phase Shift Keying or Quadature Amplitude Modulation devices), frequency modulation devices to raise the transmit signal 920 to a particular transmission frequency, and potentially error correcting coding generation devices.

It should also be noted that DPSS modulator module 915, DPSS demodulator module 950, parameter determination module 970, and symbol decoding module 980 can be implemented in software, hardware, or a combination of both.

3.1.1 Modulation

Figure 10:
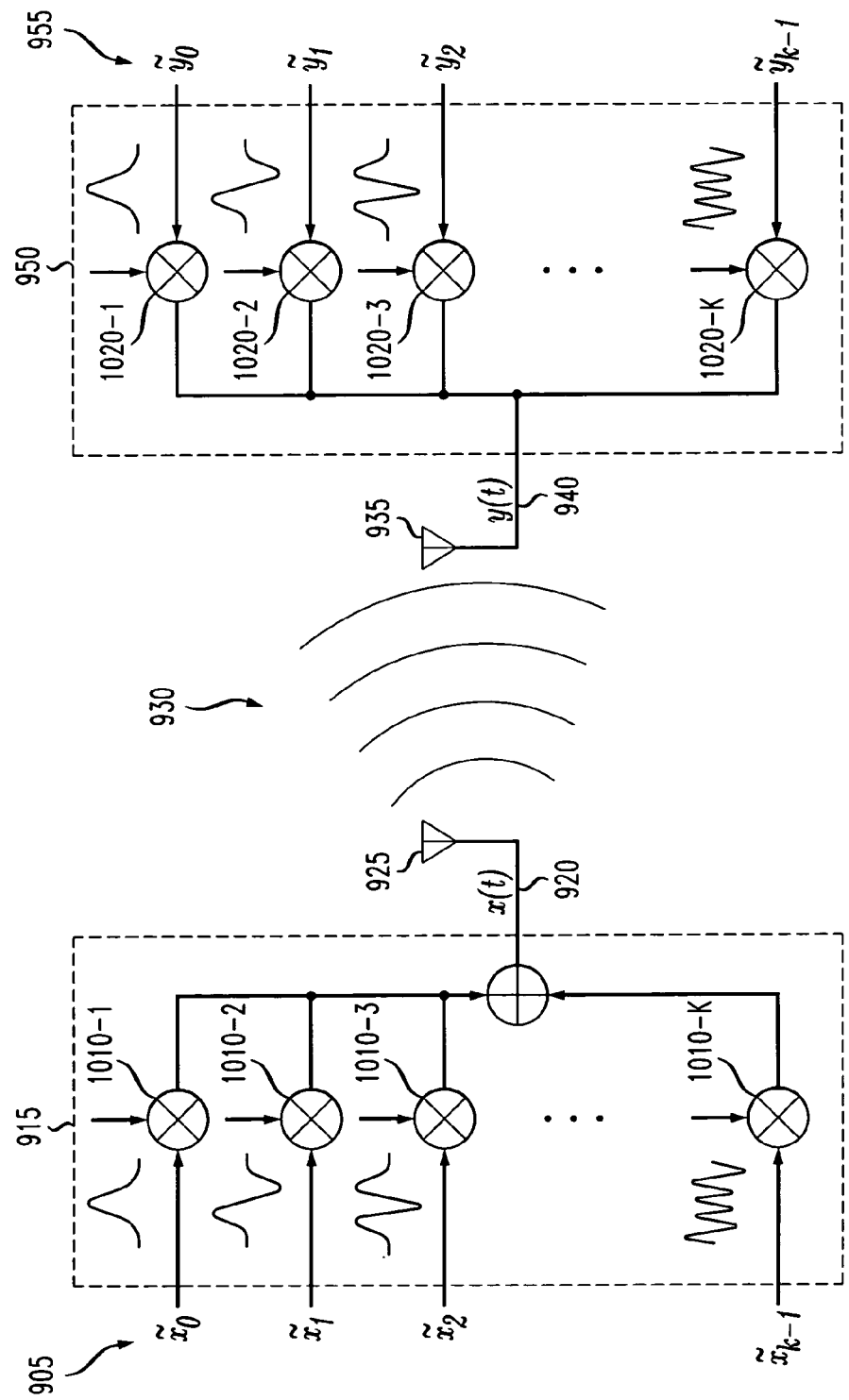
FIG. 10 is a diagram showing portions of a receiver and transmitter that are communicating over a wireless channel in accordance with a preferred embodiment of the invention.

The modulation procedure is summed up in FIG. 10 for the scalar case. As can be seen in FIG. 10, there are K multipliers 1010-1 through 1010-K (collectively, "1010") for DPSS modulator module 915, each multiplier used to modulate one of the input symbols 905 with a DPSS function. The first six DPSS functions are shown in FIGS. 6A through 6F. Outputs of the multiplier are combined by combiner 1030 to create transmit signal 920. For the DPSS demodulator module 950, there are multipliers 1020-1 through 1020-K (collectively, "1020"), each of which multiplies the received signal 940 with a DPSS function to create demodulated symbols 955, which are then shuttled to parameter determination module 970 and symbol decoding module 980 (not shown). As previously discussed, the first six DPSS function are shown in FIGS. 6A through 6F.

In every burst, K symbols $x_i$, i=1, ..., K, are transmitted. Some of them, namely p, must be used to transmit pilot symbols known to the receiver, to estimate the channel. The value of p must be chosen as $p \geq 3$, as there are three unknowns to estimate ($H^c, H^t, H^f$). The remaining (K−p) symbols are the data to be transmitted, unknown to the receiver.

3.1.2 Pilot Placement

Each of the K symbols is modulated on one pulse shaping function (also called a DPSS symbol or Slepian). Although pilots may be placed on any of the K DPSS symbols, there are benefits to placing them on high-order DPSS symbols. In practice, the p pilot symbols on the last p adjacent Slepians. The pilots are thus separated from the data block, which makes sure that pilot symbols spill only into other pilot symbols. As all pilots are known, this is a completely controlled and reversible form of spilling.

Figure 11:
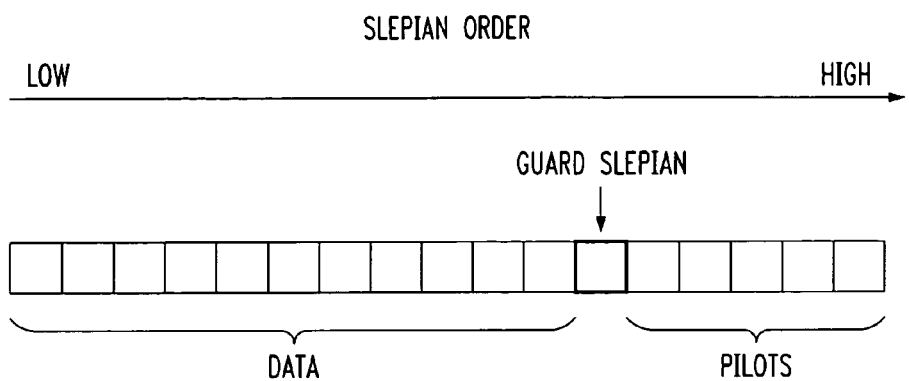
FIG. 11 is a block diagram showing pilot placement on the K DPSS pulses in a single transmission burst, in accordance with a preferred embodiment of the invention.

A potential problem arises on the border of the pilot block and the data block: the last data symbol spills into the first pilot symbol and deteriorates the channel estimation. In practice, it is therefore chosen to modulate a zero on the (K−p)th Slepian. This is called a "guard" Slepian, by the means of which physical interaction between the data and pilot blocks is eliminated. The guard Slepian is not necessary but is beneficial. The pilots are carried by the higher order Slepians because inter-symbol spilling is stronger among those than among lower-order Slepians. For the estimation procedure this is a welcome effect, as it allows the time and frequency variations $H^t$ and $H^f$ to be estimated with greater precision. FIG. 11 shows a recommended distribution, in terms of Slepian symbols, of data and pilot symbols in a burst and how these symbols are ordered. As seen in FIG. 11, pilot placement on the K Slepian pulse shaping functions occurs in a burst. The pilot block is separated from the data block by a gap, the "guard Slepian." Keep in mind that this figure represents neither a sequential order in time nor in frequency, but in the Slepian basis. All symbols are spread over the whole time-frequency block.

3.1.3 Demodulation

All K waveforms $\tilde{x}_k s_k(t)$ are added together and transmitted over the channel. The received signal y(t) is demodulated by K matched filters which separate the K orthonormal pulse shaping functions. The resulting demodulated symbols are the $\tilde{y}_k$.

3.1.4 Estimation of the Three Channel Coefficients

Those $\tilde{x}_k^p$ that are pilot symbols, and the corresponding $\tilde{y}_k^p$ are used to estimate the three channel coefficients by minimizing $$\|\tilde{y}_k^p - H_{kl}^p \tilde{x}_l^p\|, \quad (3.1)$$

where $H_{kl}^p$ is the sub-matrix of the channel operator $H_{kl}$ that is associated with the pilot Slepians. If the following is plugged $$H_{lk} = (\delta_{lk} H^c + T_{lk} H^t + F_{lk} H^f) \quad (3.2)$$

in equation 3.1, it means that the parameters $H^c$, $H^t$ and $H^f$ are fit to the measured data in a least mean squares sense. Equation 3.1 may be represented in a form in which it could be solved with a Matlab (an analysis program by The Mathworks, Natick, Mass.) solver or other software or hardware device, for any number of antennas, N. A program for performing the estimation scheme of the present invention has been performed on simulated and on real data. This is described in more detail in chapters 4 and 5 of Karin Sigloch, "Communicating Over Multiple-Antenna Wireless Channels With Both Temporal and Spectral Fluctuations," which has been incorporated by reference above.

Care has to be taken to achieve a good conditioning of the correlation matrix that has to be inverted in the course of the least mean squares estimation. This matrix can be engineered in the sense that the choice of good pilots is up to the designer. It is possible to derive an analytical form for the best pilots. It is also possible to use Monte Carlo optimization to find good condition numbers for the matrix. In general, better condition numbers can be obtained if one is prepared to increase the number of pilots. For the results presented in chapter 5 of Sigloch, the author worked with condition numbers around 4, and chose p=4 or 5. Once the estimate $H_{lk}$ of the channel is known, and one can proceed to the decoding of the data symbols.

3.1.5 Quick Decoding Algorithm

As described previously, every demodulated symbol $\tilde{y}_k$ depends only on three transmitted symbols. For the kth received symbol, all possible triplets $(\tilde{x}_{k-1}, \tilde{x}_k, \tilde{x}_{k+1})$ have to be considered as potentially transmitted sequences, but this is much less than considering all combinations of K symbols. Moreover, the Slepians are linked together in the sense that $\tilde{x}_{k-1}, \tilde{x}_k, \tilde{x}_{k+1}$ affect $\tilde{y}_k$, but $\tilde{x}_k$ and $\tilde{x}_{k+1}$ also affect the next received symbol $\tilde{y}_{k+1}$. So even if one combination of $(\tilde{x}_{k-1}, \tilde{x}_k, \tilde{x}_{k+1})$ seems to explain well the reception of $\tilde{y}_k$, there will still be a penalty if it does not explain well the reception of $\tilde{y}^{k-1}$ and $\tilde{y}_{k+1}$. Finding the best fitting sequence $\tilde{x}_1 \ldots, \tilde{x}_K$ is a dynamic programming problem. Its depth is three, as three neighboring signals contribute to each $\tilde{y}_k$. This kind of problem is well known in communications, as well as ways of tackling it. Viterbi's algorithm is usually used as a quick and convergent method of decoding and may be used here. Those skilled in the art can design and implement an adapted version of this algorithm for any number of antennas.

3.1.6 Extension to the Matrix Case

Multiple-In-Multiple-Out (short MIMO) systems are a recent development in wireless communications where multiple antennas are used both on the transmitting and receiving sides. For the same total transmit power, signaling bandwidth, and signaling duration, MIMO systems can achieve much higher channel capacities than systems with only one antenna on each side. In the best case, that is if there is the same number N of antennas at the transmitter and the receiver, and if the channel is flat-fading with Gaussian noise, the theoretical channel capacity at high signal-to-noise ratios is N times higher than for a scalar system under the same conditions, using the same signaling resources.

The principle of MIMO communications is that in addition to temporal and spectral diversity, another form of diversity is exploited to distinguish data streams originating from different antennas. Spatial diversity, and recently polarization diversity, have been proposed and shown to work in experiments.

Now, a brief discussion of how MIMO works will be given. Let M be the number of antennas at the transmitter, and N the number of antennas at the receiver. The M transmit antenna send out M independent data streams, all of them simultaneously and over the same bandwidth. The M signals get scattered by the environment, and each of the N receive antennas receives a superposition of waves originating from all M transmit antennas. The continuous, time-variant transfer function h(t,τ) (Equation 1.1) is then a matrix of dimension N×M, since the paths from every transmit antenna to every receive antenna all have different transfer coefficients. The crucial assumption is that the environment provides rich scattering. The central paradigm shift, when going from current scalar techniques to MIMO communications, is that in MIMO scattering is treated as an ally rather than an adversary. If in spatial MIMO transmit as well as receive antennas are sufficiently spaced from each other (about one wavelength or more for diffuse environments), then all M data streams are scattered independently. In that case, the transfer matrix has full rank, and the sent signals can be retrieved from the received signals by inverting the channel matrix. In polarization MIMO, all M data streams originate from the same spot in space, but they are modulated onto differently polarized waves. M is at most six, as there are six degrees of freedom in polarization, three orthogonal directions of the electric and three of the magnetic field. The polarized components are scattered independently, depending on the random angles at which the waves hit the scatterers. The data streams modulated onto differently polarized carriers can thus be separated at the receiver.

The current wave of MIMO research started with seminal contributions on the theoretical capacity limits of multiple-antenna channels in scattering environments, by Foschini, Gans and Teletar. See Foschini, "Layered Space-Time Architecture for Wireless Communication in a Fading Environment When Using Multiple Antennas," Bell Labs Technical Journal, Vol. 1, No. 2, 41-59 (Autumn 1996); Foschini et al., "On Limits of Wireless Communications in a Fading Environment When Using Multiple Antennas," Wireless Personal Communications, Vol. 6, No. 3, 311 (March 1998); and Teletar, "Capacity of Multi-Antenna Gaussian Channels," European Transactions on Telecommunications, (1999), the disclosures of which are hereby incorporated by reference. Another important contribution was the publication of the BLAST algorithm, a computationally efficient algorithm for the detection of the M signals at the receiver. For more information about the BLAST algorithm, see Golden et al., "Detection Algorithm and Initial Results Using the V-BLAST Space-Time Communication Architecture," Electronics Letters, Vol. 35, No. 1, 14-15 (January 1999), the disclosure of which is hereby incorporated by reference. The computational cost of MIMO is considerable compared to scalar systems. Polarization MIMO was proposed and demonstrated in experiments by Andrews, Mitra and deCarvalho in 2001. See Andrews et al., "Tripling the Capacity of Wireless Communications Using Electromagnetic Polarization," Nature 409, 316-318, (January 2001), the disclosure of which is hereby incorporated by reference.

An even bigger hurdle than channel inversion may be the channel estimation problem. The derivations of capacity limits assume the channel to be known. In practice, knowing the channel means estimating it often enough, and the number of pilots needed to learn it can be so large that not much resources remain for data. The basic problem, as explained more in detail in Section 1 above, is that the even in the best case, with N antennas on either side, the total number of symbols in MIMO is only N times what it would be in the single antenna case. Unfortunately, the number of pilot symbols needed to estimate the N×N MIMO channel matrix grows much faster than that, namely with $N^2$.

Figure 13:
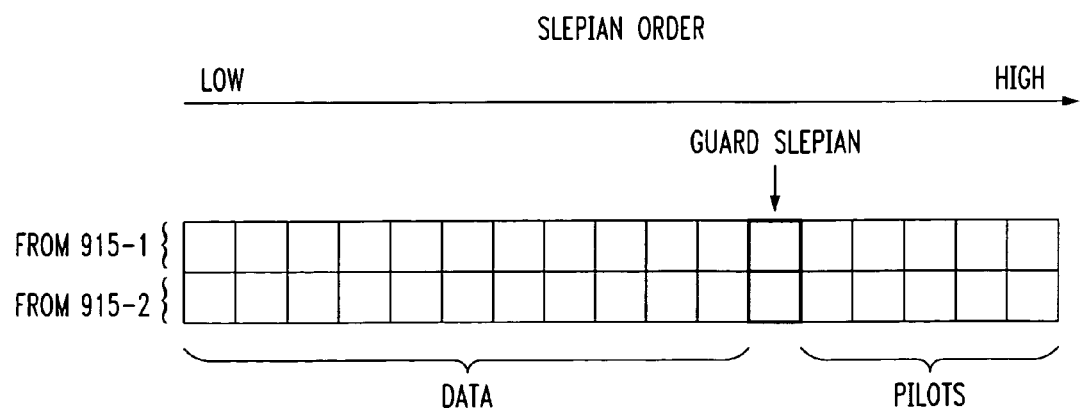
FIG. 13 is a block diagram showing pilot placement on the K DPSSs pulses in multiple transmission burst, in accordance with a preferred embodiment of the invention.
Figure 12:
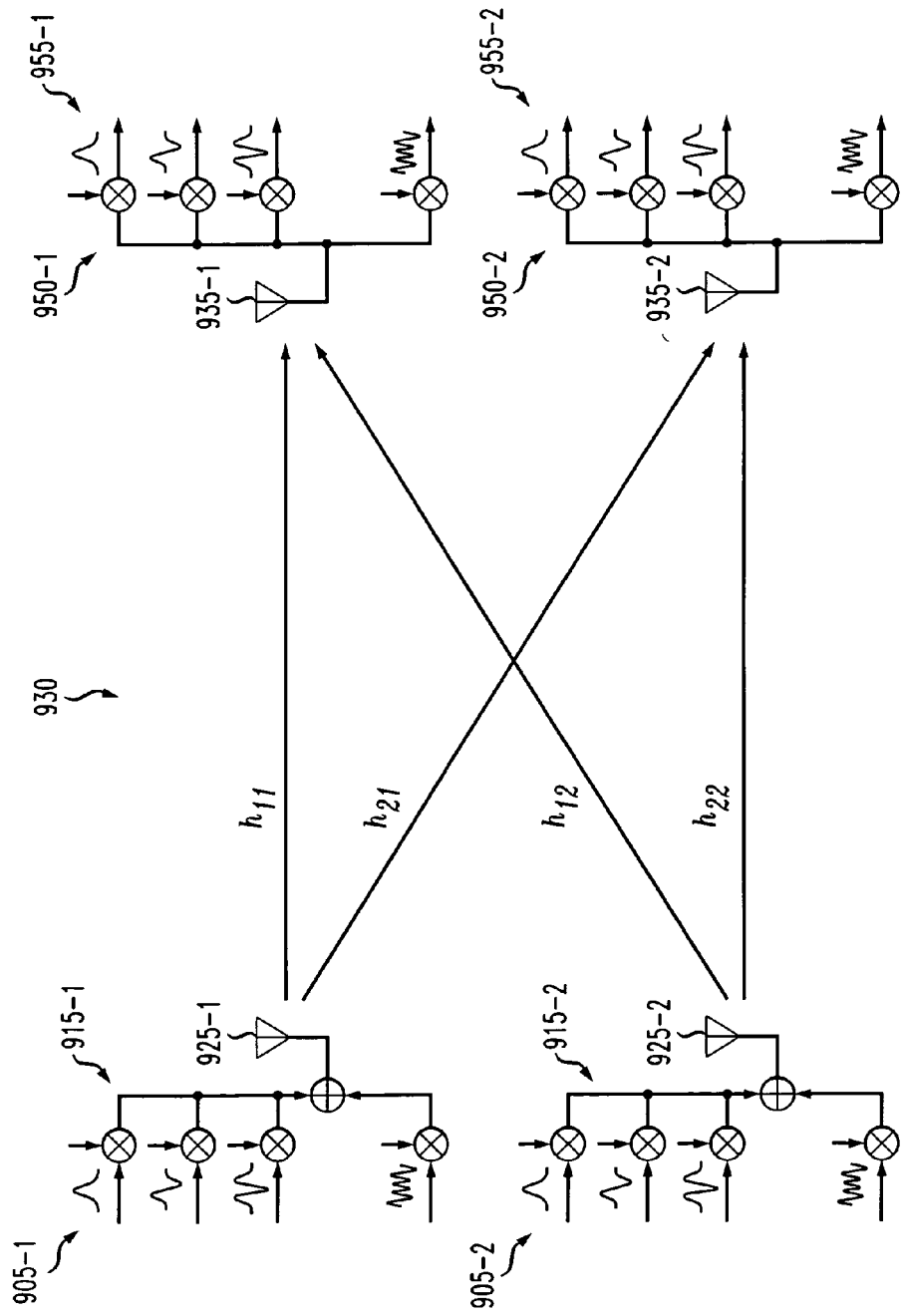
FIG. 12 is a diagram showing portions of multiple receivers and multiple transmitters that are communicating over a wireless channel in accordance with a preferred embodiment of the invention.

The extension to the multiple antenna case is conceptually straightforward, although sometimes tricky in practical implementation. Mathematics for the matrix case are worked out below. A diagram of a MIMO communication is shown in FIG. 12, where two transmitters (comprising DPSS modulator modules 915-1 and 915-2) transmit using two antennas 925-1 and 915-2 over channel 930 to antennas 935-1 and 935-2 of two receivers (comprising DPSS demodulator modules 950-1 and 950-2). DPSS demodulator module 950-1 basically interacts with two different channel operators, $h_{11}$ and $h_{12}$. Similarly, DPSS demodulator module 950-2 interacts with the channel operators $h_{21}$, and $h_{22}$. The parameters $H^c$, $H^t$ and $H^f$ are each 2×2 matrices and the demodulated symbols 955-1 and 955-2 are used to determine these parameters. A recommended scheme for modulating data and pilot symbols on Slepian functions is shown in FIG. 13.

The system of FIG. 12 may be extended to N transmitters and N receivers. Each of the N transmit antennas transmits one of the bursts described above, except that one now has to use $pN^2$ Slepians for pilots, where $p \geq 3$, because the channels $H^c$, $H^t$ and $H^f$ are N×N matrices, each with $N^2$ complex coefficients to estimate.

The N transmit antennas each send a waveform $x_\alpha(t)$, $\alpha=1, \ldots, N$, and each of the N receive antennas receives a waveform $y_\beta(t)$, $\beta=1, \ldots, N$. Every $y_\beta(t)$ is a superposition of contributions from all N transmit antennas, i.e., distorted versions of $x_\alpha(t)$. The demodulation and decoding works as in the scalar case, except that now the dynamic decoding algorithm has to treat vectors of symbols instead of single symbols.

Appendix: Mathematics for MIMO

The following indices will be used:

| basis variable | indices | range |
| --- | --- | --- |
| time | i, j | 1, ..., n |
| frequency | u, v | 1, ..., n |
| Slepians | k, l | 1, ..., K |
| antennas | α, β | 1, ..., N |

As shown above, the transmission equation for the scalar channel is as follows:

$$y_j = H_{ji} x_i.$$

In addition to describing the transition from relative time i to absolute time j, the MIMO channel equation will also have to express the wave propagation from every transmit antenna to every receive antenna. The variable $\alpha$ is introduced as transmit antenna index and the variable $\beta$ is introduced as receive antenna index. The most general channel equation for the multi-antenna case is then $$y_{j\beta} = H_{ji\beta\alpha} x_{i\alpha} \quad (A.1)$$

The first-order time and frequency variations are modeled by $$y_{j\beta} = \left( H^c_{\beta\alpha} \delta_{ji} + H^t_{\beta\alpha} T_{ji} + H^f_{\beta\alpha} F_{ji} \right) x_{i\alpha} \quad (A.2)$$

$$y_{j\beta} = \delta_{ji} x_{i\alpha} H^c_{\alpha\beta} + T_{ji} x_{i\alpha} H^t_{\alpha\beta} + F_{ji} x_{i\alpha} H^f_{\alpha\beta} \quad (A.3)$$

Note that the time and frequency operators are the same as in the scalar case. The channel coefficients $$H^c_{\alpha\beta}, H^t_{\alpha\beta},$$

and $$H^f_{\alpha\beta}$$

are now N×N matrices, that have to be estimated. The transformation to the Slepian basis works in the same way as for the scalar case:

(1) $\Psi_{ik}$ denotes the n×K matrix of the K Slepians.
(2) The Slepians are orthonormal:

$$\Psi_{li} \Psi_{ik} = \delta_{lk}$$

(3) Modulation: let the transmitted waveform at antenna $\alpha, x_{i\alpha}$, be a linear combination of the Slepians:

$$x_{i\alpha} = \Psi_{ik} \tilde{x}_{k\alpha},$$

where the $\tilde{x}_{k\alpha}$ are the digital symbols (pilots and data) to be transmitted by antenna $\alpha$. Each of them is modulated onto a different Slepian. The scheme thus works with K pulse shaping functions.

(4) Demodulation: the received waveform $y_{j\beta}$ is demodulated by K matched filters:

$$\tilde{y}_{l\beta} = \Psi_{lj} y_{j\beta},$$

where $\tilde{y}_{l\beta}$ are the demodulated symbols at antenna $\beta$.

The whole transmission equation in the Slepian basis is $$\tilde{y}_{l\beta} = \Psi_{lj} y_{j\beta} \quad (A.4)$$
$$\tilde{y}_{l\beta} = \Psi_{lj}(\delta_{ji} H^c_{\beta\alpha} + T_{ji} H^t_{\beta\alpha} + F_{ji} H^f_{\beta\alpha})\Psi_{ik}\tilde{x}_{k\alpha}$$
$$\tilde{y}_{l\beta} = (\Psi_{lj}\delta_{ji}\Psi_{ik} H^c_{\beta\alpha} + \Psi_{lj} T_{ji}\Psi_{ik} H^t_{\beta\alpha} + \Psi_{lj} F_{ji}\Psi_{ik} H^f_{\beta\alpha})\tilde{x}_{k\alpha}$$
$$\tilde{y}_{l\beta} = (\delta_{ik} H^c_{\beta\alpha} + \mathcal{T}_{ik} H^t_{\beta\alpha} + \mathcal{F}_{ik} H^f_{\beta\alpha})\tilde{x}_{k\alpha}$$

$$\tilde{y}_{l\beta} = \mathcal{H}_{lk}\tilde{x}_{k\alpha} \quad (A.5)$$

The last formula directly relates the symbols $\tilde{x}_{k\alpha}$ transmitted by antenna $\alpha$, to the symbols $\tilde{y}_{l\beta}$ received by antenna $\beta$. The decoding works as for the scalar case, only that now it is necessary to compare vectors of N symbols. Let $$y^{(k)}_\beta$$

be the N-dimensional vector of symbols that consists of all N symbols demodulated from Slepian number k. This vector will then depend on $$x^{(k-1)}_\alpha, x^{(k)}_\alpha \text{ and } x^{(k+1)}_\alpha,$$

that is, all 3N symbols that were modulated onto Slepians number k−1, k and k+1. This ends the mathematics of the MIMO communication situation.

4. Conclusion

The scheme described is the first known attempt to do truly joint time-frequency channel estimation in wireless communications. As this model is closer to physical reality than the current zeroth-order approach, it is expected that it will turn out to be considerably more pilot-efficient in practice. Moreover the first-order time-frequency scheme offers a computationally elegant way of decoding, due to very controlled energy spilling within and across bursts in the Slepian basis. A nice by-product of time-frequency estimation is the robustness towards synchronization errors.

It is to be understood that the embodiments and variations shown and described herein are merely illustrative of the principles of this invention and that various modifications may be implemented by those skilled in the art without departing from the scope and spirit of the invention.

We claim:

1. A method, comprising:
   determining one or more parameters of a channel model that permits non-stationarity within each individual data symbol; and
   applying the one or more parameters to one or more received symbols to determine one or more decoded symbols.

2. The method of claim 1, wherein the channel model is modeled as a transfer function relating transmitted symbols to received symbols, the transfer function comprising the one or more parameters.

3. The method of claim 1, wherein the parameters of the channel model comprise a time slope coefficient, a frequency slope coefficient, and a complex amplitude.

4. The method of claim 3, wherein there are a plurality of antennas receiving signals and wherein the time slope coefficient, frequency slope coefficient, and complex amplitude are matrices with a number of entries corresponding to a square of the number of antennas, wherein the method further comprises the step of demodulating, for each of the receivers, a respective one of the signals to create the received symbols, and wherein the step of determining further comprises the step of determining the parameters by using pilot symbols in received symbols from each of the receivers.

5. The method of claim 1, further comprising the step of demodulating a received signal by using one or more Discrete Prolate Spheroidal Sequences (DPSSs) to create the received symbols.

6. The method of claim 5, further comprising the step of demodulating the received signal by using a plurality of DPSSs, the step of demodulating producing a received symbol for each of the plurality of DPSSs.

7. The method of claim 6, wherein a first predetermined number of the received symbols correspond to known pilot symbols, and wherein the step of determining the one or more parameters further comprises solving a system of equations using the known pilot symbols to determine the parameters.

8. The method of claim 7, wherein the system of equations is represented through an equation having a plurality of matrices, the equation comprising a reception matrix having received symbols corresponding to the known pilot symbols, a pilot matrix having the known pilot symbols, and a channel model matrix having the parameters, wherein the equation is the reception matrix minus a product of the channel model matrix and the pilot matrix.

9. The method of claim 8, wherein the step of determining one or more parameters further comprises the step of minimizing a magnitude of the equation.

10. The method of claim 8, wherein a second predetermined number of the received symbols correspond to data symbols, and wherein the step of applying further comprises the step of applying a second system of equations to the data symbols, the second system of equations comprising the parameters.

11. The method of claim 10, wherein:
   the parameters of the channel model comprise a time slope coefficient, a frequency slope coefficient, and a complex amplitude;
   the data symbols are represented by a data vector; and
   the second system of equations comprises:
      a first multiplication of a unity matrix, the data vector, and the complex amplitude;
      a second multiplication of a time operator matrix, the data vector, and the time slope coefficient;
      a third multiplication of a frequency operator matrix, the data vector, and the frequency slope coefficient; and
      an addition of results of the first, second, and third multiplications, whereby the decoded symbols result from the addition.

12. An apparatus, comprising:
   a parameter determination module adapted to determine one or more parameters of a channel model that permits non-stationarity within each individual data symbol; and
   a symbol decoding module coupled to the parameter determination module and adapted to apply the one or more parameters to one or more received symbols to determine one or more decoded symbols.

13. The apparatus of claim 12, wherein the channel model is modeled as a transfer function relating transmitted symbols to received symbols, the transfer function comprising the one or more parameters.

14. The apparatus of claim 12, wherein the parameters of the channel model comprise a time slope coefficient, a frequency slope coefficient, and a complex amplitude.

15. The apparatus of claim 12, further comprising a demodulator module coupled to both the parameter determination module and the symbol decoding module, the demodulator module demodulating a received signal by using one or more Discrete Prolate Spheroidal Sequences (DPSSs) to create the received symbols.

16. The apparatus of claim 15, wherein:
the demodulator is further adapted to demodulate the received signal by using a plurality of DPSSs, the demodulating producing a received symbol for each of the plurality of DPSSs;
a first predetermined number of the received symbols correspond to known pilot symbols and the apparatus is adapted to couple the pilot symbols to the parameter determination module;
a second predetermined number of the received symbols correspond to data symbols and the apparatus is adapted to couple the data symbols to the symbol decoding module; and
the parameter determination module is further adapted to solve a system of equations using the known pilot symbols to determine the parameters.

* * * * *